United States Patent
Yoshii et al.

(10) Patent No.: US 8,219,767 B2
(45) Date of Patent: Jul. 10, 2012

(54) INFORMATION PROCESSING APPARATUS AND DATA RECOVERING METHOD

(75) Inventors: Kenichiro Yoshii, Tokyo (JP); Hiroshi Yao, Kanagawa (JP); Tomohide Jokan, Kanagawa (JP); Tatsunori Kanai, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 969 days.

(21) Appl. No.: 12/199,111

(22) Filed: Aug. 27, 2008

(65) Prior Publication Data

US 2009/0164743 A1    Jun. 25, 2009

(30) Foreign Application Priority Data

Dec. 21, 2007  (JP) .................................. 2007-329612

(51) Int. Cl.
  *G06F 12/00* (2006.01)
  *G06F 13/00* (2006.01)
  *G06F 13/28* (2006.01)
(52) U.S. Cl. ................. 711/162; 711/E12.103
(58) Field of Classification Search .................. None
  See application file for complete search history.

(56) References Cited

U.S. PATENT DOCUMENTS

| | | | | |
|---|---|---|---|---|
| 7,287,133 | B2 * | 10/2007 | Rowan et al. | 711/156 |
| 7,356,734 | B2 * | 4/2008 | Ricart et al. | 714/20 |
| 7,519,858 | B2 * | 4/2009 | Korlepara | 714/15 |
| 2008/0189498 | A1 * | 8/2008 | Brown | 711/162 |

FOREIGN PATENT DOCUMENTS

JP   2005-107573   4/2005

OTHER PUBLICATIONS

Yoshii et al., U.S. Appl. No. 12/198,473, filed Aug. 26, 2008, entitled Information Processing Apparatus and Data Recovering Method.

* cited by examiner

*Primary Examiner* — Sanjiv Shah
*Assistant Examiner* — Craig Goldschmidt
(74) *Attorney, Agent, or Firm* — Finnegan, Henderson, Farabow, Garrett & Dunner, L.L.P.

(57) ABSTRACT

A information processing apparatus includes, upon instructing for writing back stored contents of a main memory unit to the stored contents of the main memory unit at the time of previous modification in a sequence number that is used for identifying whether write back to the main memory unit is needed, from a backup data stored in a backup memory unit, the sequence number stored in a sequence number memory unit. The information processing apparatus selects the backup data including an integrity verification data indicating that writing is carried out completely. The information processing apparatus extracts an original data and a write destination address included in the selected backup data and writes the original data, for each original data and the write address extracted from the backup data, to a storage area, of the main memory unit, indicated by the write destination address.

4 Claims, 17 Drawing Sheets

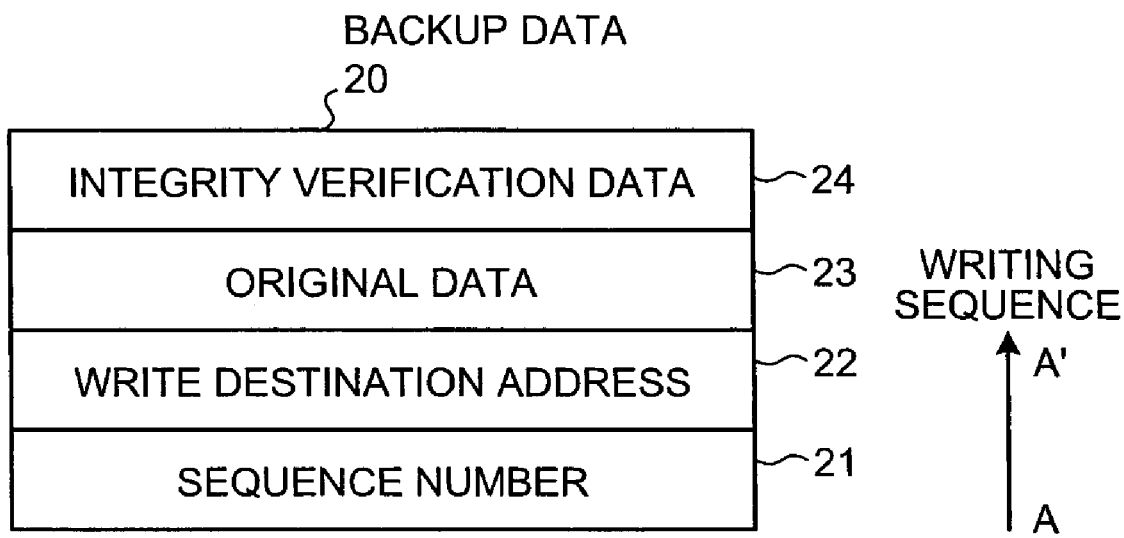
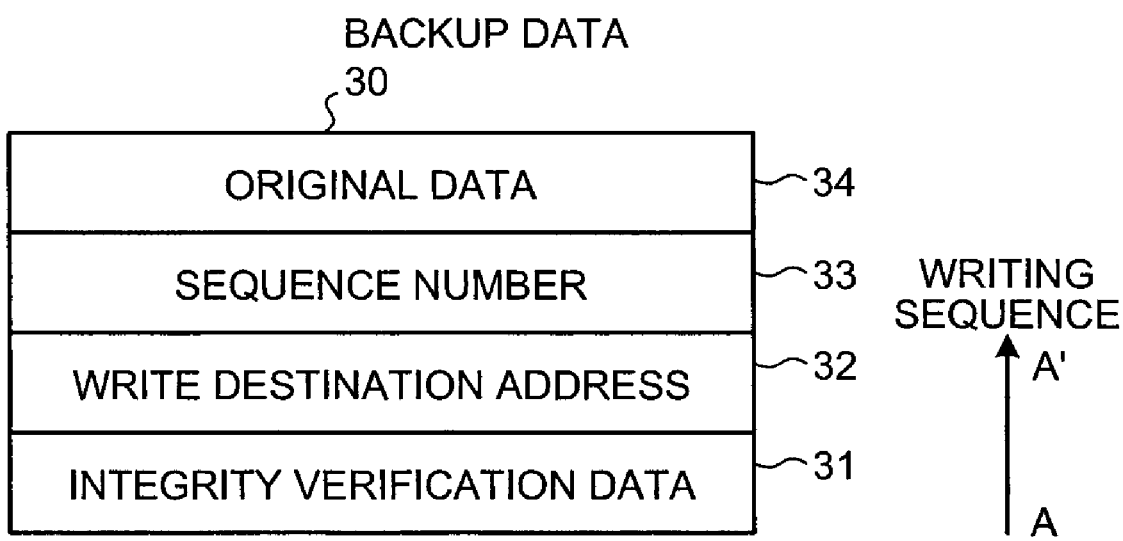

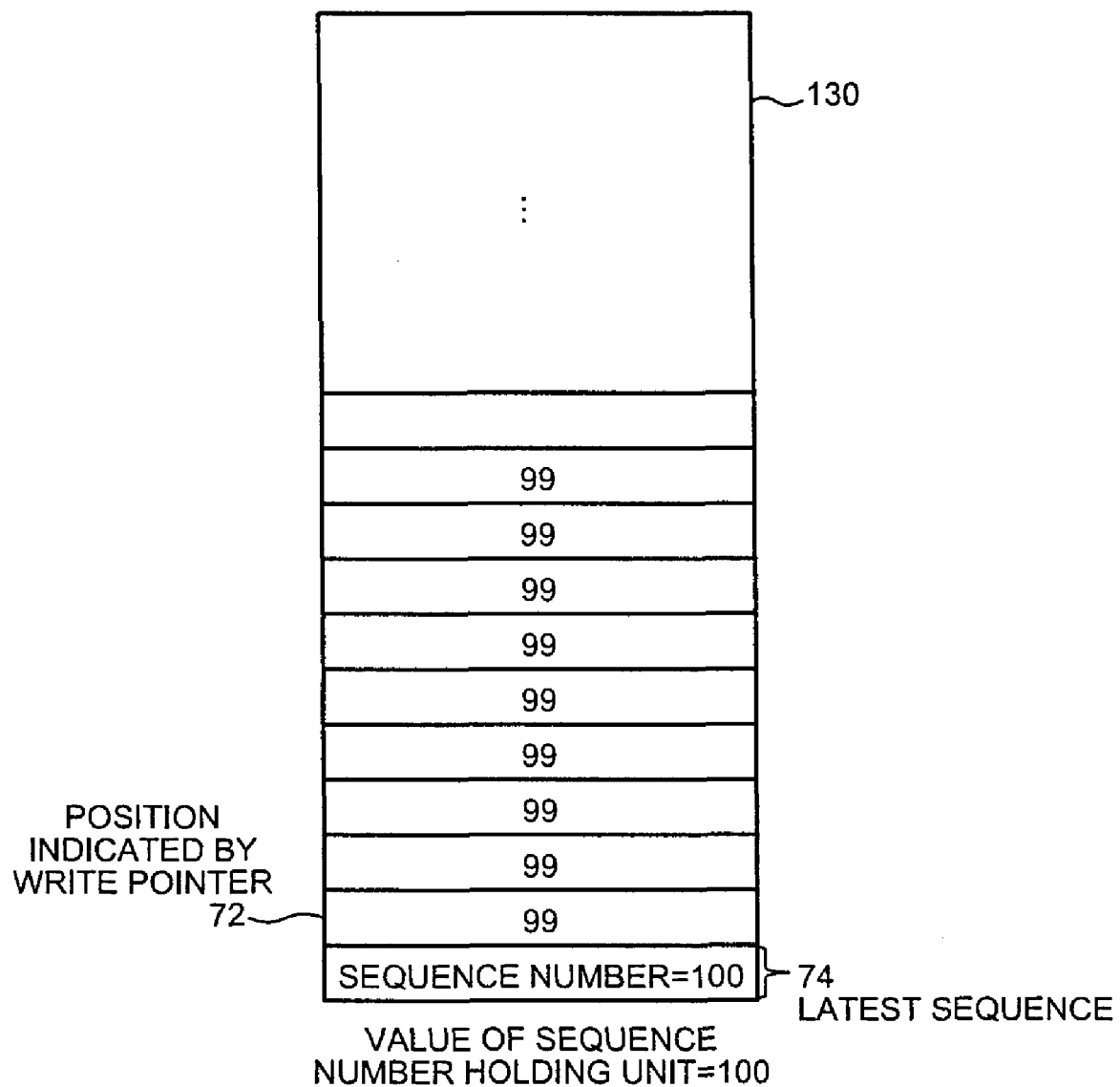

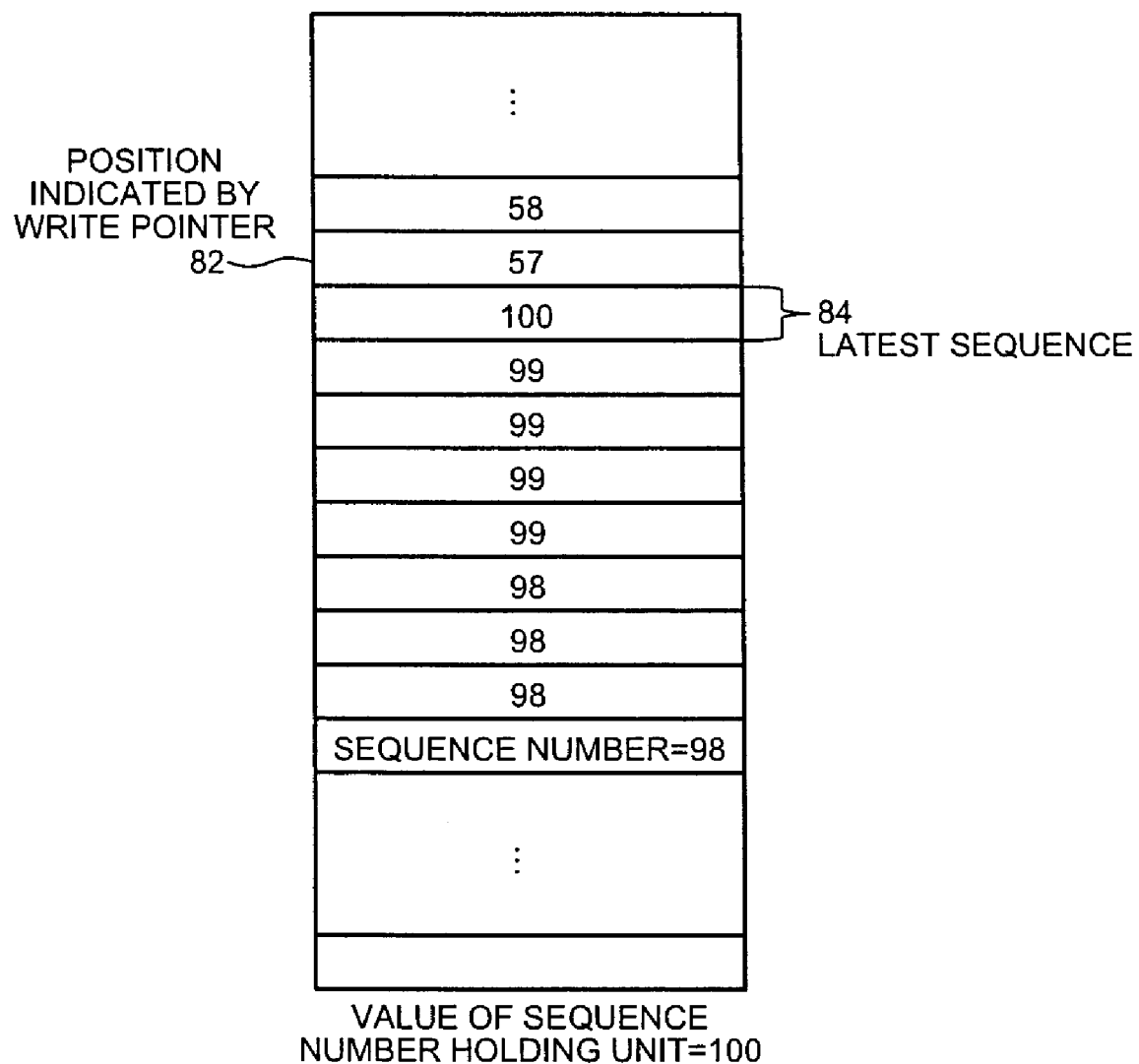

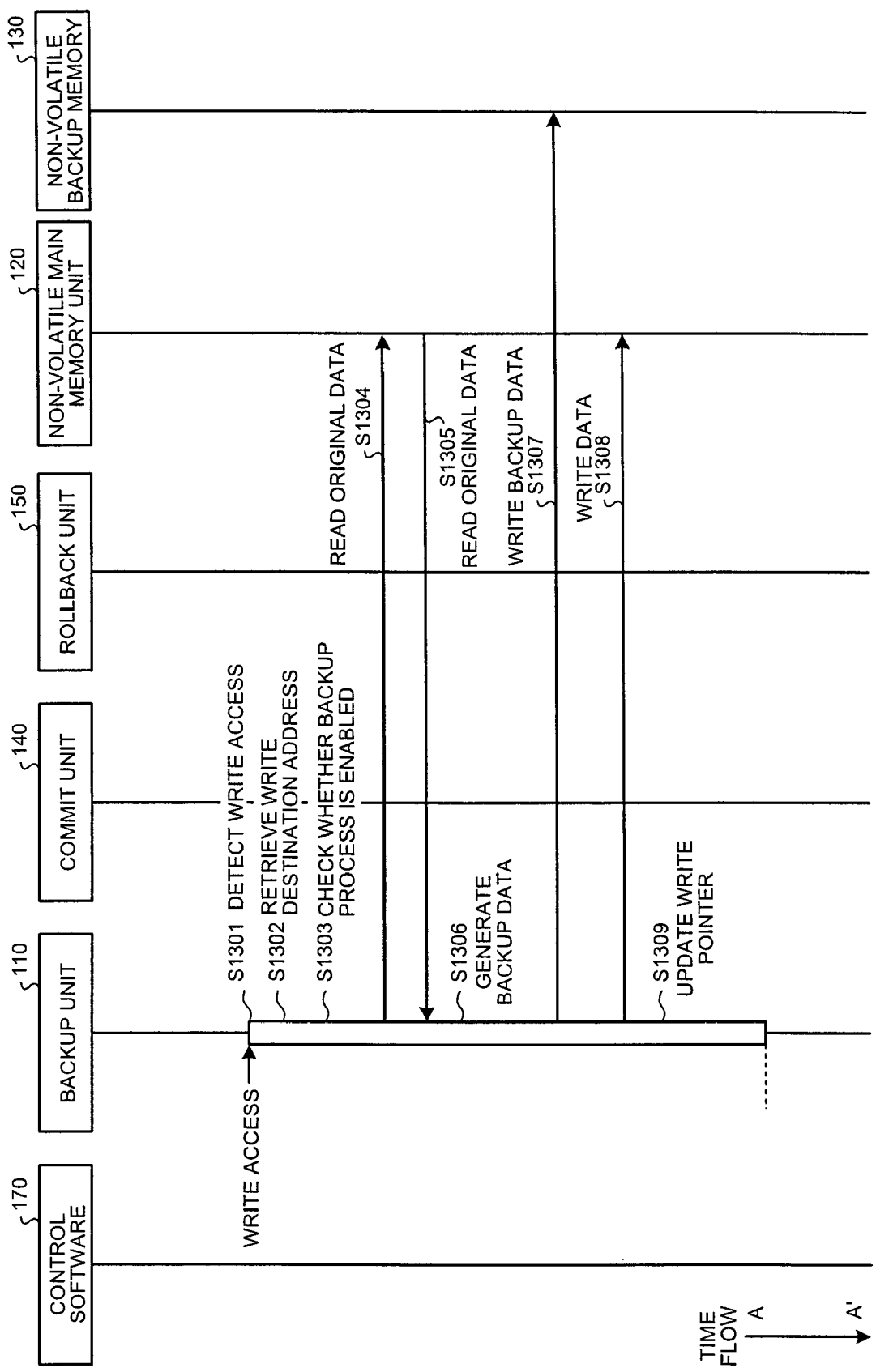

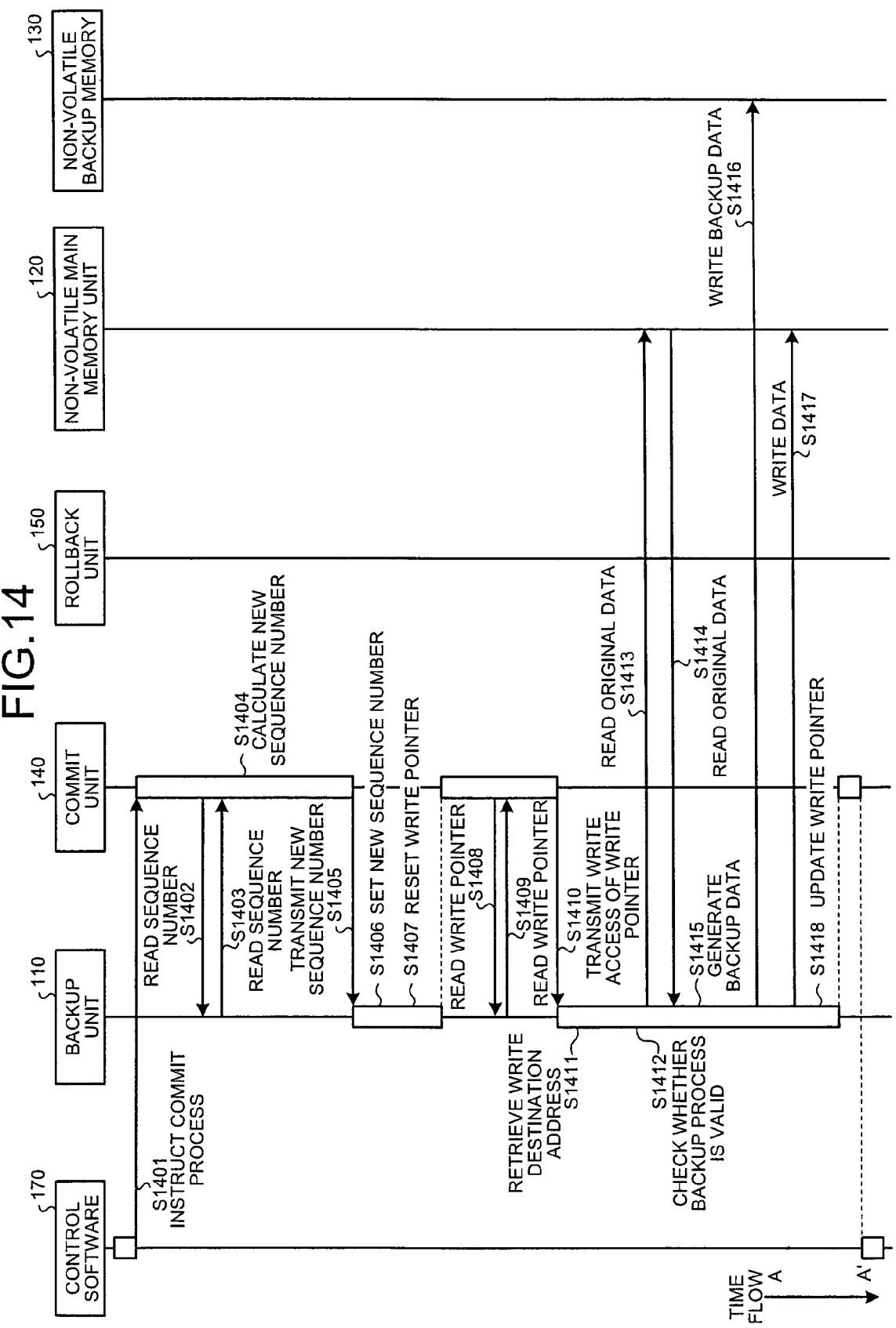

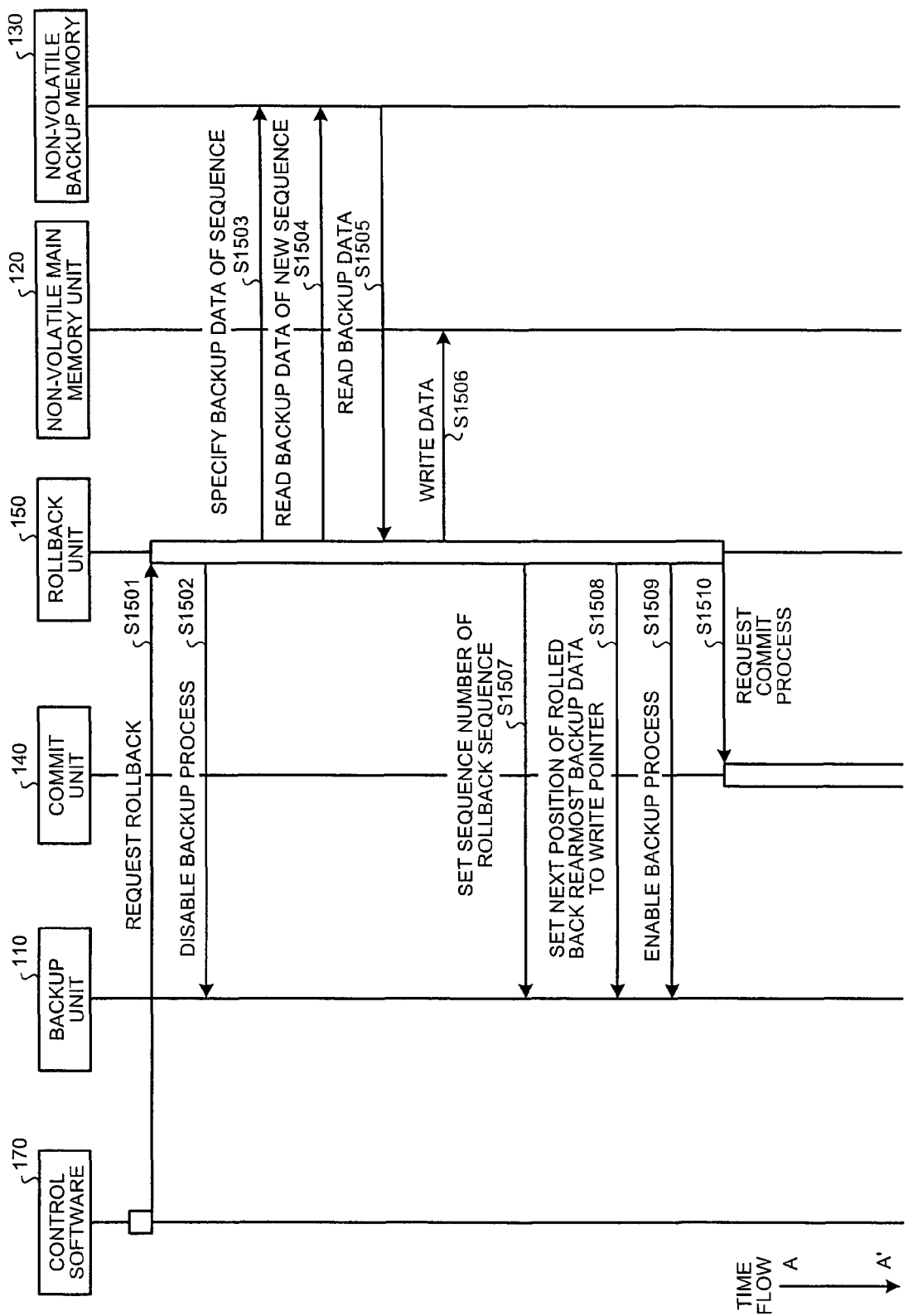

INFORMATION PROCESSING APPARATUS AND DATA RECOVERING METHOD

CROSS-REFERENCE TO RELATED APPLICATIONS

This application is based upon and claims the benefit of priority from the prior Japanese Patent Application No. 2007-329612, filed on Dec. 21, 2007; the entire contents of which are incorporated herein by reference.

BACKGROUND OF THE INVENTION

1. Field of the Invention

The present invention relates to a information processing apparatus that includes a non-volatile main memory unit and a data recovering method.

2. Description of the Related Art

Recently, development of a technology related to non-volatile memories such as a flash memory, a magneto-resistive random access memory (MRAM), a ferroelectric random access memory (FeRAM), and a phase change random access memory (PRAM) is in progress. In the non-volatile memory, recorded data cannot be lost even if a power outage occurs. It is anticipated that in the future, the non-volatile memory will be a substitute for a volatile memory such as a dynamic random access memory (DRAM) that is presently widely used as a main memory in computers.

If such a non-volatile memory is used as the main memory in the computers, data saved in the main memory or a status of a system will not be lost even if the power outage occurs in the main memory during processing of computer programs. The data stored in the main memory or the status of the system will be retained in the main memory. Due to this, when power is restored, computer operations can be easily restarted from a status at the time of the power outage, thus shortening activation time of the computers and enhancing operability. In the non-volatile memory, which differs from the volatile memory, a power supply device is not required for maintaining stored contents. Thus, reduction in power consumption of the entire computer, miniaturization of a battery, and longevity of the battery can be anticipated.

In an existing technology disclosed in JP-A 2005-107573 (KOKAI), when power is restored after sudden power outage in the computer that uses such non-volatile memory, interruption is notified to a central processing unit (CPU) by using a power monitoring mechanism for maintaining and restoring the status at the time of the power outage. The status of the CPU is saved in the main memory unit by using control software that is similar to an operating system.

However, in the technology described in JP-A 2005-107573 (KOKAI), a battery such as a separate capacitor is needed at the time of sudden power outage, for concluding a writing process that is being performed and stabilizing the contents in the non-volatile memory (hereinafter, called "non-volatile main memory unit") that is used as the main memory unit. Generally, the battery used in the computer for concluding the writing process is a secondary battery. Thus, insufficient power is likely to be supplied if the power outage occurs frequently.

In the technology described in JP-A 2005-107573 (KOKAI), the existing technology mentioned earlier, a process log is obtained for returning the computer status, including contents of the non-volatile main memory unit, to a specific status prior to the power outage. If a power supply including the battery is disrupted while writing a log data to a log area, the log data is likely to be written in an incomplete manner to the log area. Due to this, even if the contents of the non-volatile main memory unit are recovered from the log that is left in the log area at the time of restoring power, because the data is written in the incomplete manner, the log data that is required for recovery cannot be specified. Thus, a failure occurs in the data recovery, any prior status cannot be recovered, and the process cannot be continued.

SUMMARY OF THE INVENTION

According to one aspect of the present invention, a information processing apparatus includes a main memory unit that is non-volatile and has a plurality of first storage areas; a backup memory unit that is non-volatile and has a plurality of second storage areas that stores a copy of data stored in the main memory unit; a sequence number storage unit that stores a sequence number used at the time of identifying whether each data stored in the backup memory unit needs to be written back to the main memory unit; a first reading unit that reads an original data stored in advance in the second storage area specified by a write destination address, when a write access is detected, the write access being transmitted from a processor unit and including data to be written to the main memory unit and a write destination address specifying a write destination of data to be written; a second reading unit that reads the sequence number stored in the sequence number storage unit; a first writing unit that writes a backup data to the backup memory unit, the backup data including the original data, the write destination address included in the write access, the sequence number, and an integrity verification data that indicates whether the original data, the write destination address, and the sequence number are completely written to the backup memory unit; a second writing unit that writes the data to be written to the first storage area of the main memory unit specified by the write destination address, after writing the backup data to the backup memory unit; a updating unit that updates a value of the sequence number stored in the sequence number storage unit; a selecting unit that selects from the backup data stored in the backup memory unit, the backup data that includes the sequence number stored in the sequence number storage unit and the integrity verification data indicating that the data is completely written, when receiving an instruction for writing back stored contents of the main memory unit to the stored contents of the main memory unit at the time of previous modification in the sequence number; an extracting unit that extracts the original data and the write destination address included in the selected backup data; and a third writing unit that writes, for each of the original data and the write address extracted from the backup data, the original data to the first storage area in the main memory unit indicated by the write destination address.

According to another aspect of the present invention, a data recovering method executed in an information processing apparatus that includes a main memory unit that is non-volatile and has a plurality of first storage areas, a backup memory unit that is non-volatile and has a plurality of second storage areas that stores a copy of data stored in the main memory unit, and a sequence number storage unit that stores a sequence number used at the time of identifying whether each data stored in the backup memory unit needs to be written back to the main memory unit, the method comprising: reading an original data stored in advance in the second storage area specified by a write destination address, when a write access is detected, the write access being transmitted from a processor unit and including data to be written to the main memory unit and a write destination address specifying a write destination of data to be written; reading the sequence number stored in the sequence number storage unit; writing a backup data to the backup memory unit, the backup data including the original data, the write destination address included in the write access, the sequence number, and an integrity verification data that indicates whether the original data, the write destination address, and the sequence number are completely written to the backup memory unit; writing the data to be written to the first storage area of the main memory unit specified by the write destination address, after writing the backup data to the backup memory unit; updating a value of the sequence number stored in the sequence number storage unit; selecting from the backup data stored in the backup memory unit, the backup data that includes the sequence number stored in the sequence number storage unit and the integrity verification data indicating that the data is completely written, when receiving an instruction for writing back stored contents of the main memory unit to the stored contents of the main memory unit at the time of previous modification in the sequence number; extracting the original data and the write destination address included in the selected backup data; and writing, for each of the original data and the write address extracted from the backup data, the original data to the first storage area in the main memory unit indicated by the write destination address.

BRIEF DESCRIPTION OF THE DRAWINGS

FIG. 2 is a drawing of an example for explaining a data structure of a backup data;

FIG. 3 is a drawing of another example for explaining a data structure of the backup data;

FIG. 7C is a drawing of an example for explaining a status of the non-volatile backup memory (stack) after a backup data using a new sequence number is written;

FIG. 8C is a drawing of still another example for explaining a status of the non-volatile backup memory (ring buffer) after the backup data using the new sequence number is written;

FIG. 13 is a sequence diagram of the backup process performed by each unit;

FIG. 14 is a sequence diagram of the commit process performed by each unit; and FIG. 15 is a sequence diagram of the rollback process performed by each unit.

DETAILED DESCRIPTION OF THE INVENTION

Exemplary embodiments of the information processing apparatus and the data recovering method according to the present invention are explained in detail below with reference to the accompanying drawings. A information processing apparatus according to an embodiment of the present invention is applied to a personal computer (hereinafter, called "PC"). However, the present invention is not to be thus limited. The information processing apparatus can be applied to various apparatuses such as a server apparatus and a gaming machine that include a main memory unit.

The present embodiment is explained with reference to the accompanying drawings. Configuration of the PC according to the embodiment is explained first.

Figure 1:
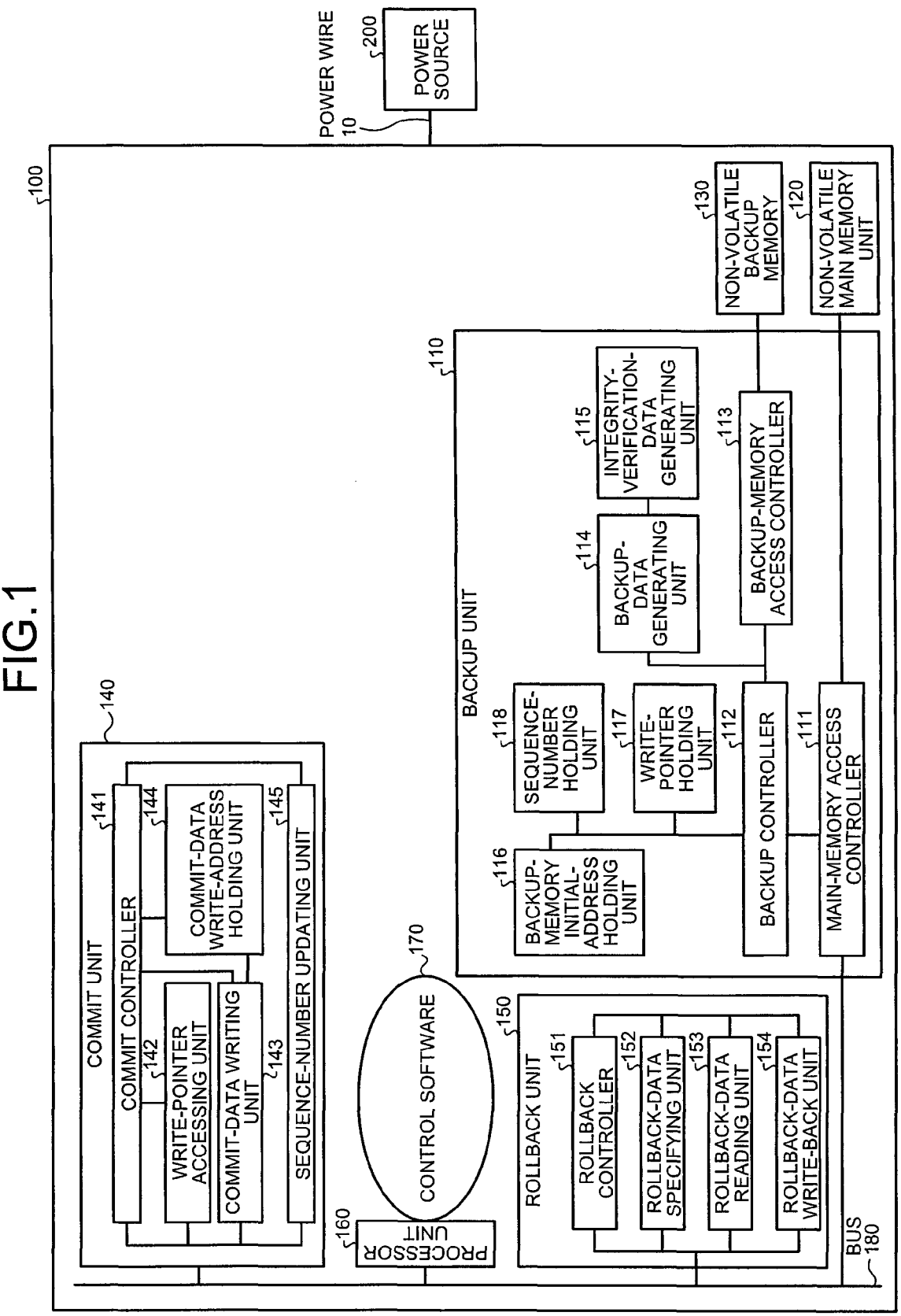
FIG. 1 is a block diagram of a PC according to an embodiment of the present invention.

As shown in FIG. 1, a PC 100 according to the present embodiment includes a backup unit 110, a non-volatile main memory unit 120, a non-volatile backup memory 130, a commit unit 140, a rollback unit 150, a processor unit 160, control software 170, and a bus 180. Power is supplied to the PC 100 from a power source 200 via a power wire 10.

The non-volatile main memory unit 120 is a non-volatile memory such as a magneto-resistive random access memory (MRAM) and a ferroelectric random access memory (Fe-RAM). The non-volatile main memory unit 120 stores therein computer programs of software that is operated in the processor unit 160 or data used by the software. While writing to the non-volatile main memory unit 120, the processor unit 160 transmits a write access to a main-memory access controller 111. Based on the write access received from the processor unit 160, the main-memory access controller 111 carries out writing to the non-volatile main memory unit 120. The write access includes data written to the non-volatile main memory unit 120 by the processor unit 160 and an address (hereinafter, called "write destination address") of the non-volatile main memory unit 120 that specifies a write destination of the data.

Similarly as the non-volatile main memory unit 120, the non-volatile backup memory 130 is the non-volatile memory. The non-volatile backup memory 130 records a backup data. The backup data is the data that is used for recovering data stored in the non-volatile main memory unit 120 at the time of power restoration after sudden power outage. Specifically, the backup data includes the write destination address, which is the address of the data updated at least in the non-volatile main memory unit 120, data (hereinafter, called "original data") before update that is stored in the address, a sequence number, and an integrity verification data.

The sequence number identifies the serial backup data stored in the non-volatile backup memory 130. In other words, the sequence number is used for identifying, when writing back data to the non-volatile main memory unit 120, whether data, from the backup data stored in the non-volatile backup memory 130, needs to be written back to the non-volatile main memory unit 120. Serial integers can be used as the sequence number. The sequence number is stored in a sequence-number holding unit 118 that is described later. Furthermore, the integrity verification data determines whether the backup data stored in the non-volatile backup memory 130 is completely written.

Next, a data structure of the backup data stored in the non-volatile backup memory 130 is explained below. As shown in FIG. 2, a backup data 20 is stored in the non-volatile backup memory 130 in an order of a sequence number 21, a write destination address 22, an original data 23, and an integrity verification data 24. Thus, a group of the sequence number 21, the write destination address 22, the original data 23, and the integrity verification data 24 forms a single backup data.

Furthermore, a structure of another backup data is explained. As shown in FIG. 3, a backup data 30 is stored in the non-volatile backup memory 130 in an order of an integrity verification data 31, a write destination address 32, a sequence number 33, and an original data 34. Thus, a group of the integrity verification data 31, the write destination address 32, the sequence number 33, and the original data 34 forms a single backup data.

The sequence number can be used as contents of the integrity verification data. Furthermore, the original data can be used as the contents of the integrity verification data. Whether the entire backup data is completely written can be determined based on whether the integrity verification data matches with the sequence number or the integrity verification data matches with the original data. Upon the integrity verification data matching with the sequence number and the original data, it is determined that the entire backup data is completely written. However, upon the integrity verification data not matching with the sequence number and the original data, it is determined that the entire backup data is not completely written. Thus, the backup data cannot be used for data recovery.

In such determining methods, the order in which the data forming the backup data is written to the non-volatile backup memory 130 is considered. For example, in the data structure shown in FIG. 2, upon using the same sequence number in the integrity verification data, if it is determined that the integrity verification data and the sequence number stored in both storage areas of the backup data in the non-volatile backup memory 130 are completely written, it can be determined that the write destination address and the original data stored in a storage area between the storage area of the sequence number and the storage area of the integrity verification data are also completely written.

Similarly in FIG. 3, if it can be determined that the integrity verification data and the original data are completely written, it can be determined that the write destination address and the sequence number stored in a storage area between the storage area of the integrity verification data and the storage area of the original data are completely written.

The data that can determine by integrity verification whether each data forming the backup data is completely written or any error is likely to be occurred in the data can be used as the integrity verification data. Thus, a parity data in which exclusive OR is calculated by using any one of the original data, the write destination address, and the sequence number or the data in which an error correcting code is used can be used as the integrity verification data. A specific method is not enforced for the data contents or a creation method.

At the time of writing to the non-volatile main memory unit 120, the backup unit 110 creates the backup data and writes to the non-volatile backup memory 130. Specifically, upon detecting the write access, which is transmitted to the main-memory access controller 111, to the non-volatile main memory unit 120, the backup unit 110 reads from the non-volatile main memory unit 120, the original data that is stored in the write destination address included in the write access. The backup unit 110 generates the backup data from the group of the write destination address, the original data, the sequence number and the integrity verification data and stores in the non-volatile backup memory 130. The backup unit 110 then writes the data, which is included in the write access and is instructed for writing to the non-volatile main memory unit 120, to the storage area, of the non-volatile main memory unit 120, that is actually specified by the write destination address.

The backup unit 110 further includes the main-memory access controller 111, a backup controller 112, a backup-memory access controller 113, a backup-data generating unit 114, an integrity-verification-data generating unit 115, a backup-memory initial-address holding unit 116, a write-pointer holding unit 117, and the sequence-number holding unit 118.

Based on a read/write access, which is received via the bus 180, to the non-volatile main memory unit 120, the main-memory access controller 111 reads the data stored in the non-volatile main memory unit 120 or writes the data to the non-volatile main memory unit 120. However, upon detecting the write access, which is received via the bus 180, to the non-volatile main memory unit 120, instead of immediately writing the data to the non-volatile main memory unit 120, the main-memory access controller 111 temporarily transmits the write destination address to the backup controller 112.

Based on the access to the non-volatile main memory unit 120 from the backup controller 112, the main-memory access controller 111 reads/writes data stored in the non-volatile main memory unit 120. The main-memory access controller 111 transmits to the backup controller 112, the access to the non-volatile backup memory 130 via the bus 180. Furthermore, the main-memory access controller 111 transmits the access to the write-pointer holding unit 117 and the sequence-number holding unit 118 to the backup controller 112.

For taking backup of data, upon receiving the write access to the non-volatile main memory unit 120 from the main-memory access controller 111, the backup controller 112 reads from the non-volatile main memory unit 120, via the main-memory access controller 111, the data stored in the storage area, of the non-volatile main memory unit 120, indicated by the write destination address. The backup controller 112 transmits the write destination address and the data read from the non-volatile main memory unit 120 to the backup-data generating unit 114.

The backup controller 112 reads/writes the data stored in the non-volatile backup memory 130 via the backup-memory access controller 113. The backup controller 112 reads/writes a write pointer stored in the write-pointer holding unit 117, a backup-memory initial-address stored in the backup-memory initial-address holding unit 116, and the sequence number stored in the sequence-number holding unit 118. The backup controller 112 transmits the sequence number read from the sequence-number holding unit 118 to the backup-data generating unit 114.

Based on the access from the backup controller 112, the backup-memory access controller 113 reads/writes the data stored in the non-volatile backup memory 130.

The backup-data generating unit 114 generates the backup data from the write destination address, the original data, and the sequence number. The write destination address of the non-volatile main memory unit 120 is transmitted from the backup controller 112 and the original data is read from the storage area, of the non-volatile main memory unit 120, indicated by the write destination address.

Based on the data received from the backup-data generating unit 114, the integrity-verification-data generating unit 115 creates the integrity verification data to be used for verifying whether the backup data read from the non-volatile backup memory 130 at the time of rollback, is completely written.

The backup-memory initial-address holding unit 116 maintains an initial address of the non-volatile backup memory 130. In response to a request from the backup controller 112, the backup-memory initial-address holding unit 116 updates contents or transmits the contents to the backup controller 112.

The write-pointer holding unit 117 maintains the write pointer. The write pointer is an address in the non-volatile backup memory 130 in which the backup data is written. In response to the request from the backup controller 112, the write-pointer holding unit 117 updates the contents or transmits the contents to the backup controller 112.

The sequence-number holding unit 118 maintains the sequence number that is used for generating the backup data. The sequence-number holding unit 118 updates the sequence number maintained in response to a request from a sequence-number updating unit 145 of the commit unit 140 that is described later. The sequence-number holding unit 118 transmits the sequence number maintained in response to the request from the backup controller 112. The sequence-number holding unit 118 can be volatile or non-volatile.

The backup unit 110 includes a switch that indicates whether to perform a backup process. The backup unit 110 also includes a function that enables or disables the entire backup process with respect to writing to the non-volatile main memory unit 120. A physical switch or data maintained in a memory can be used as the switch, which indicates whether to perform the backup process upon detecting the write access to the non-volatile main memory unit 120.

The commit unit 140 performs a commit process. The commit process is a series of processes, which creates the status (hereinafter, called "checkpoint"), of the non-volatile main memory unit 120, that is the restoration target, when power is restored after sudden power outage and restoring the status of the non-volatile main memory unit 120 is necessary.

Upon the commit unit 140 performing the commit process, a new checkpoint is created and is stored in the non-volatile backup memory 130. Furthermore, by performing the commit process, the backup data for restoring the status of the non-volatile main memory unit 120 to the status of the previous checkpoint is not required. Thus, in the commit process, it is necessary to invalidate the backup data stored in the non-volatile backup memory 130 after the latest commit process.

The backup data according to the present embodiment includes the sequence number that identifies serial backup data used for writing back to the non-volatile main memory unit 120. Thus, upon performing the backup process once or a number of times in the non-volatile backup memory 130, the sequence number is modified to a new sequence number. Due to this, the backup data including the sequence number before modification can be invalidated without physically deleting from the non-volatile backup memory 130. In other words, updating the sequence number according to the present embodiment is a portion of the commit process. In the present embodiment, a single backup data or a plurality of backup data including the sequence number same as the sequence number maintained by the sequence-number holding unit 118 are called the latest sequence.

The commit unit 140 further includes a commit controller 141, a write-pointer accessing unit 142, a commit-data writing unit 143, a commit-data write-address holding unit 144, and the sequence-number updating unit 145.

Based on instructions from the control software 170, the commit controller 141 controls the entire commit process by using the write-pointer accessing unit 142, the commit-data writing unit 143, the sequence-number updating unit 145, and the commit-data write-address holding unit 144 and creates the checkpoint.

The write-pointer accessing unit 142 transmits a request to the bus 180 for reading/writing the contents of the write-pointer holding unit 117 included in the backup unit 110. The commit-data write-address holding unit 144 maintains a value of the write destination address indicating the storage area, in the non-volatile main memory unit 120, that is to be specified at the time of performing the writing process to the non-volatile main memory unit 120 at the end of the commit process. Based on instructions from the commit controller 141, contents of the commit-data write-address holding unit 144 are read/written. The sequence-number updating unit 145 reads/writes the sequence number maintained by the sequence-number holding unit 118 of the backup unit 110 via the bus 180.

In the commit process, when the contents of the write-pointer holding unit 117 that are read by the write-pointer accessing unit 142 are written to the address, of the non-volatile main memory unit 120, that is maintained in the commit-data write-address holding unit 144, the commit-data writing unit 143 transmits a write request to the bus 180. The sequence-number updating unit 145 transmits to the bus 180, a request for updating the contents of the sequence-number holding unit 118 included in the backup unit 110.

The rollback unit 150 finds and reads the latest sequence necessary for recovering the contents of the non-volatile main memory unit 120 from the backup data stored in the non-volatile backup memory 130 and writes back the original data extracted from the backup data to the non-volatile main memory unit 120. Due to the operations mentioned earlier, a status of the most recently created checkpoint that is created as the status of the non-volatile main memory unit 120 is restored.

The rollback unit 150 further includes a rollback controller 151, a rollback-data specifying unit 152, a rollback-data reading unit 153, and a rollback-data write-back unit 154.

Based on the instructions from the control software 170, the rollback controller 151 controls a rollback process realized by using the rollback-data specifying unit 152, the rollback-data reading unit 153, and the rollback-data write-back unit 154.

The rollback-data specifying unit 152 specifies the data necessary for rollback from the non-volatile backup memory 130. As mentioned earlier, even if sudden power outage occurs while writing the backup data to the non-volatile backup memory 130 and the writing process ends in an incomplete manner, the rollback-data specifying unit 152 uses the integrity verification data that includes the backup data, carries out integrity verification of the backup data, and properly specifies the backup data necessary for rollback. A specific calculating device can also be used.

The rollback-data reading unit 153 reads the backup data, which is specified by the rollback-data specifying unit 152 and is necessary for rollback, from the non-volatile backup memory 130.

The rollback-data write-back unit 154 retrieves from the backup data read by the rollback-data reading unit 153, the original data and the write destination address in the non-volatile main memory unit 120 in which the original data is written back. The rollback-data write-back unit 154 writes the original data to the storage area, of the non-volatile main memory unit 120, that is specified by the write destination address.

The processor unit 160 causes the control software 170 to operate. The control software 170 manipulates the data of the non-volatile main memory unit 120 in a normal process and provides system specific functions. The control software 170 issues a request to the commit unit 140 at appropriate timing (for example, at regular time intervals) and creates the checkpoint of the non-volatile main memory unit 120. At the time of power restoration, the control software 170 issues the request to the rollback unit 150 and returns the status of the non-volatile main memory unit 120 till the previous checkpoint.

The commit unit 140, the rollback unit 150, the processor unit 160, and the backup unit 110 are connected by the bus 180. Without connecting directly to the bus 180, the non-volatile main memory unit 120 is connected to the bus 180 via the backup unit 110. Due to this, the non-volatile main memory unit 120 is accessed via the backup unit 110. Thus, in the backup unit 110, the backup process, which is based on the access to the non-volatile main memory unit 120, can be performed. Without restricting the arrangement of the backup unit 110 between the bus 180 and the non-volatile main memory unit 120, the backup unit 110 can be arranged at any position from where the backup unit 110 can receive the access to the non-volatile main memory unit 120 before the non-volatile main memory unit 120 receives the access. In addition to the non-volatile main memory unit 120, the non-volatile backup memory 130 is connected to the backup unit 110.

The backup process performed by the backup unit 110, the commit process performed by the commit unit 140, and the rollback process performed by the rollback unit 150 are explained below with reference to FIGS. 4A and 4B.

The backup unit 110 receives the access from the bus 180 and operates.

First, the main-memory access controller 111 detects the access from the bus 180 (Step S401). The main-memory access controller 111 determines whether the detected access is the read access to the non-volatile main memory unit 120 (Step S402). Specifically, from commands included in the access, the main-memory access controller 111 determines whether the access is the read access. Apart from the read access, the main-memory access controller 111 also determines for another access such as the write access, from the commands included in the access, a type of the access or a storage medium to be accessed.

Upon determining that the detected access is the read access to the non-volatile main memory unit 120 (Yes at Step S402), the main-memory access controller 111 reads the data from the non-volatile main memory unit 120 (Step S403) and returns the read data to the bus 180.

Upon determining that the detected access is not the read access to the non-volatile main memory unit 120 (No at Step S402), the main-memory access controller 111 transmits the access to the backup controller 112 and the backup controller 112 receives the access (Step S404). The backup controller 112 determines whether the received access is the write access to the non-volatile main memory unit 120 (Step S405).

Upon determining that the received access is the write access to the non-volatile main memory unit 120 (Yes at Step S405), the backup controller 112 determines whether the backup process is enabled (Step S406). Upon determining that the backup process is not enabled (No at Step S406), the backup process is not performed and the process proceeds to Step S412. Upon determining that the backup process is enabled (Yes at Step S406), the backup controller 112 transmits a read request to the main-memory access controller 111. The main-memory access controller 111 reads the original data stored in the storage area indicated by the write destination address from the non-volatile main memory unit 120 (Step S407). The backup unit 110 then performs a backup-data generating process (Step S408). Details of the backup-data generating process are described later.

The backup controller 112 reads from the write-pointer holding unit 117, the address in the non-volatile backup memory 130 in which the generated backup data is written (Step S409). The backup-memory access controller 113 writes the backup data to the address in the non-volatile backup memory 130 (Step S410). The backup controller 112 updates a value of the pointer maintained in the write-pointer holding unit 117 (Step S411). The main-memory access controller 111 writes the data to the write destination address of the non-volatile main memory unit 120 (Step S412).

Upon determining at Step S405 that the received access is not the write access to the non-volatile main memory unit 120 (No at Step S405), the backup controller 112 determines whether the access is the access to the non-volatile backup memory 130 (Step S413). Upon determining that the access is the access to the non-volatile backup memory 130 (Yes at Step S413), the backup-memory access controller 113 reads the data of the non-volatile backup memory 130 or writes the data to the non-volatile backup memory 130 (Step S414).

Upon determining that the access is not the access to the non-volatile backup memory 130 (No at Step S413), the backup controller 112 determines whether the access is the access to the write-pointer holding unit 117 (Step S415). Upon determining that the access is the access to the write-pointer holding unit 117 (Yes at Step 415), the backup controller 112 reads or updates the value of the write-pointer holding unit 117 (Step S416).

Upon determining that the access is not the access to the write-pointer holding unit 117 (No at Step S415), the backup controller 112 determines whether the access is the access to the sequence-number holding unit 118 (Step S417). Upon determining that the access is not the access to the sequence-number holding unit 118 (No at Step S417), the process ends.

Upon determining that the access is the access to the sequence-number holding unit 118 (Yes at Step S417), the backup controller 112 reads or updates the sequence number maintained in the sequence-number holding unit 118 (Step S418). Upon determining that the access is the access to the sequence-number holding unit 118, the backup controller 112 determines whether the access is the write access (Step S419). Upon determining that the access is the write access (Yes at Step S419), in other words, upon determining the access as the portion of the commit process, the backup controller 112 resets the write pointer maintained in the write-pointer holding unit 117 (Step S420). If the non-volatile backup memory 130 is used as a stack, the write pointer is set to the initial address of the non-volatile backup memory 130. If the non-volatile backup memory 130 is used as a ring buffer, no process is performed because the write pointer does not need to be moved. Upon determining that the access is not the write access (No at Step S419), the process ends. Thus, while writing the sequence number, the backup controller 112 resets the write pointer maintained by the write-pointer holding unit 117 and performs the portion of the commit process. It is necessary to collectively perform a sequence number setting process and a write pointer resetting process performed at the time of the commit process. Due to this, writing of the backup data, which uses the new sequence number, to a wrong location can be avoided.

Figure 4A:
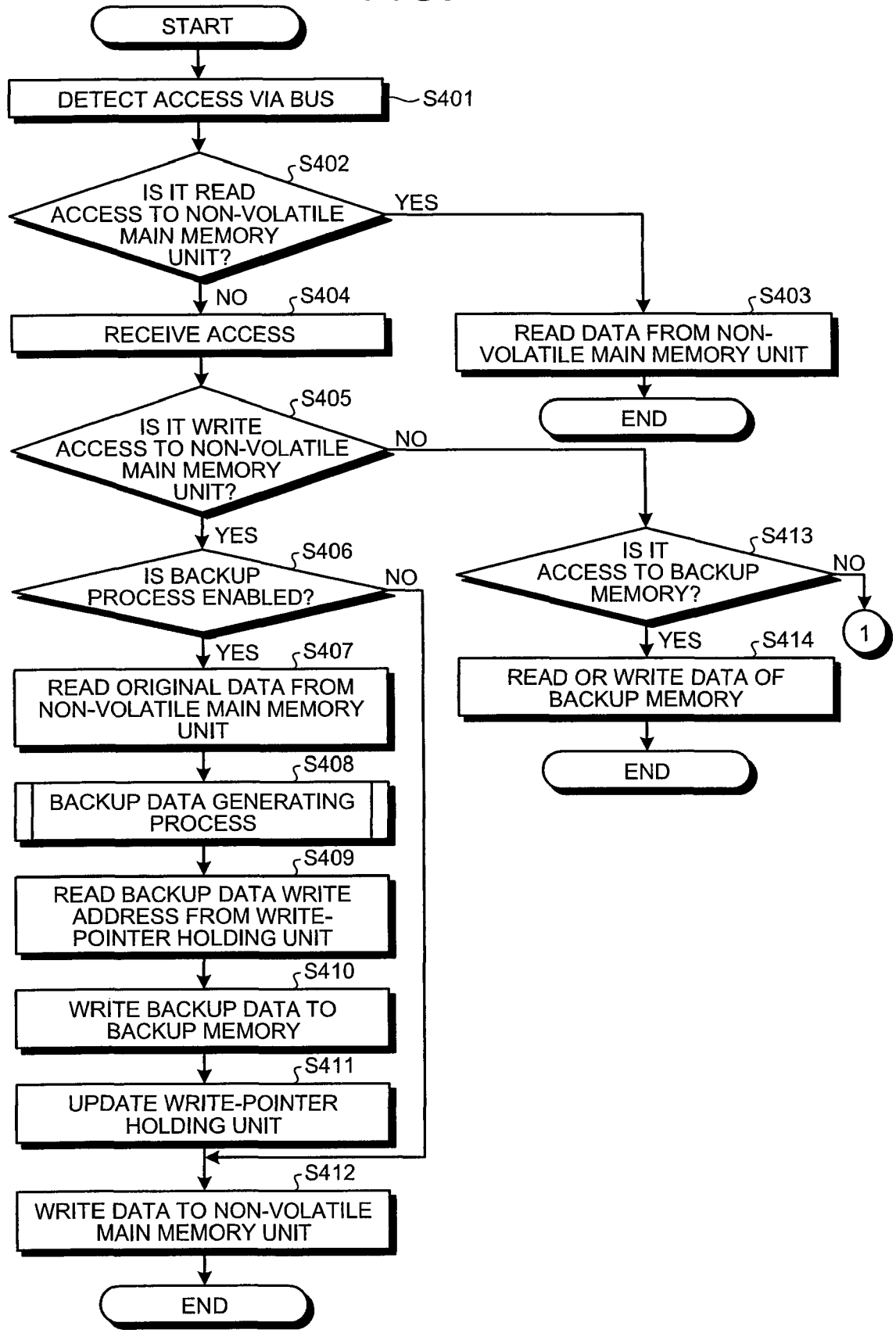
FIGS. 4A and 4B are flowcharts for explaining a backup process.
Figure 4B:
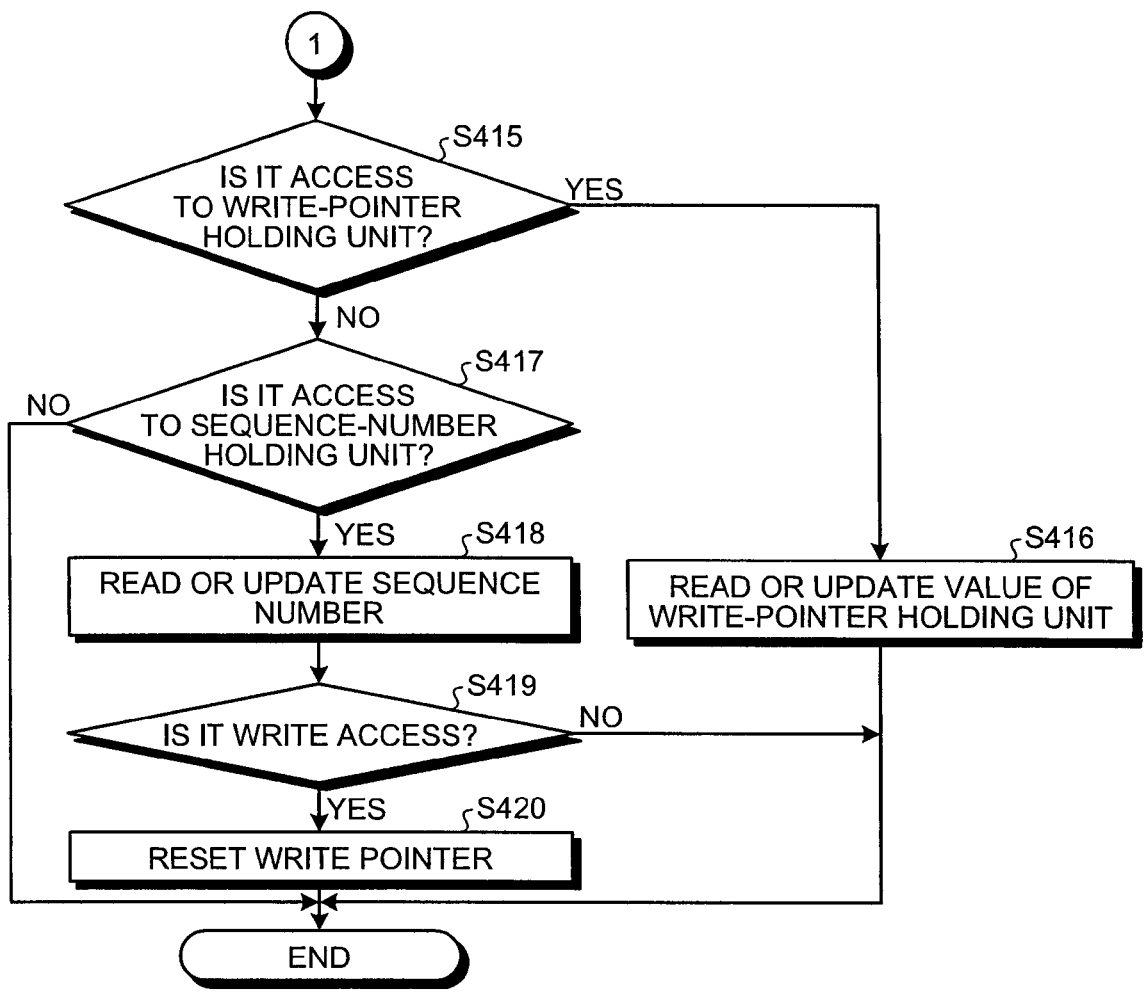
Figure 5:
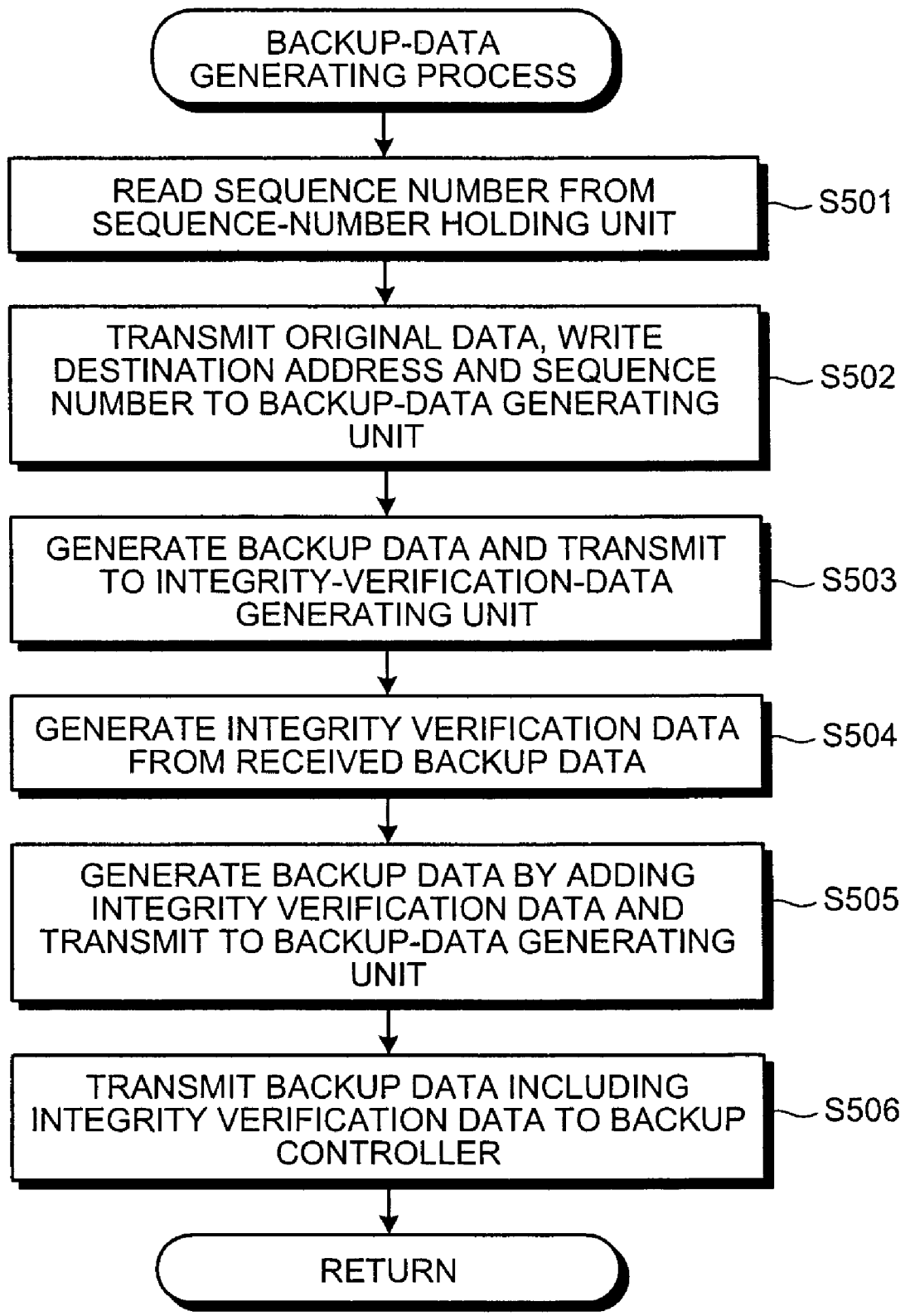
FIG. 5 is a flowchart for explaining a backup-data generating process.

The backup-data generating process performed at Step S408 shown in FIG. 4A is explained with reference to FIG. 5.

First, the backup controller 112 reads the sequence number from the sequence-number holding unit 118 (Step S501). The backup controller 112 transmits the original data, write destination address, and the sequence number of the non-volatile main memory unit 120 to the backup-data generating unit 114 (Step S502). The backup-data generating unit 114 generates the backup data from the original data, the write destination address, and the sequence number and transmits to the integrity-verification-data generating unit 115 (Step S503).

The integrity-verification-data generating unit 115 generates the integrity verification data from the received backup data (Step S504). The integrity-verification-data generating unit 115 generates the backup data in which the integrity verification data is added and transmits the generated backup data to the backup-data generating unit 114 (Step S505). The integrity verification data in the backup data is stored at a position that enables to determine that the entire backup data is completely written. A structure of the backup data is similar to the data structure, for example, shown in FIGS. 2 and 3. The backup-data generating unit 114 transmits the backup data including the integrity verification data to the backup controller 112 (Step S506).

Figure 6:
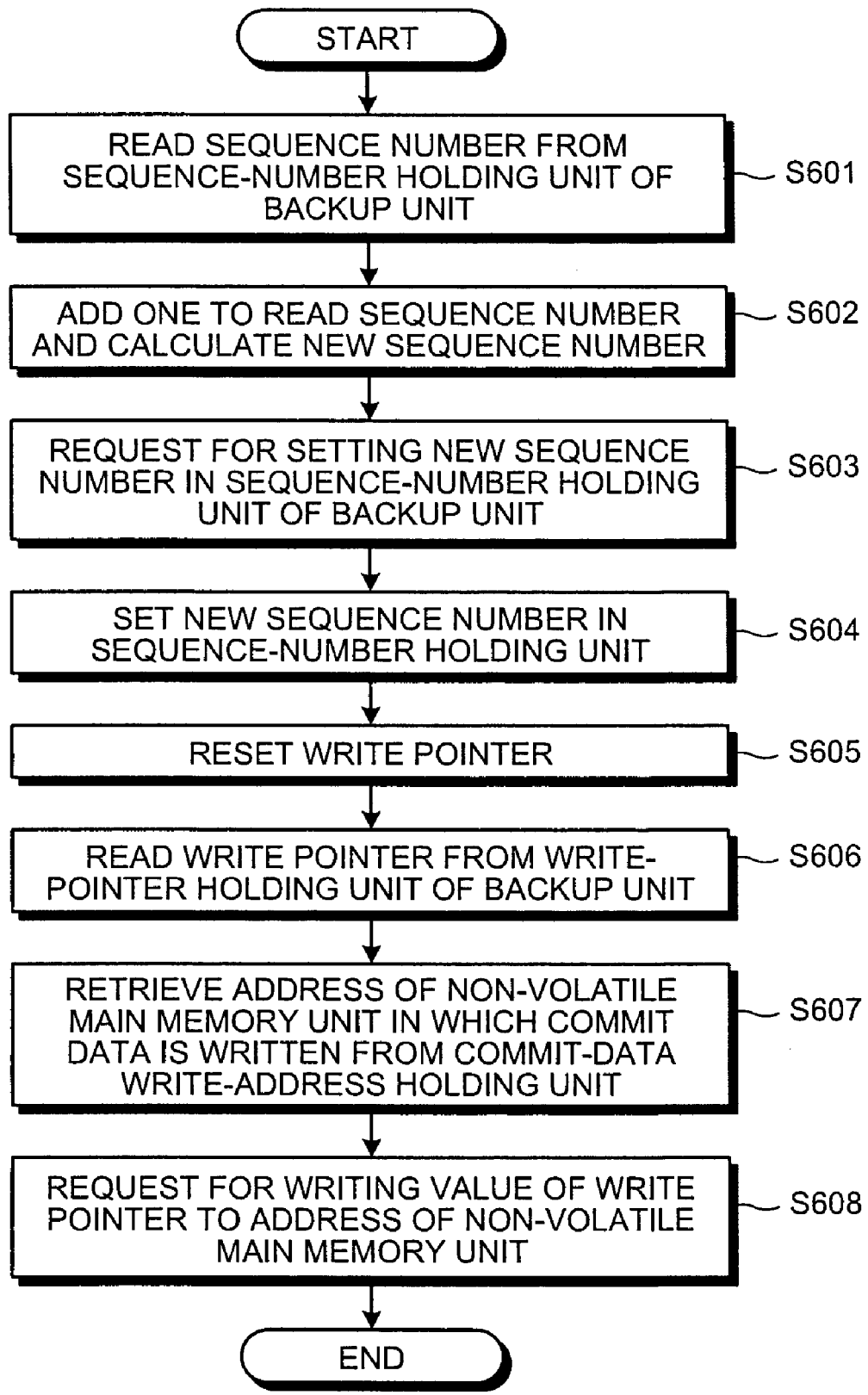
FIG. 6 is a flowchart for explaining a commit process.

The commit process performed by the commit unit 140 is explained below with reference to FIG. 6.

In the commit unit 140, the sequence-number updating unit 145 reads the sequence number from the sequence-number holding unit 118 of the backup unit 110 (Step S601). The sequence-number updating unit 145 adds one to the read sequence number and calculates a new sequence number (Step S602). The sequence-number updating unit 145 requests the backup controller 112 of the backup unit 110 for setting the new sequence number in the sequence-number holding unit 118 (Step S603).

The backup controller 112 sets the new sequence number in the sequence-number holding unit 118 (Step S604). Based on a usage method (the stack or the ring buffer, etc.) of the non-volatile backup memory 130, the backup controller 112 resets the write pointer of the write-pointer holding unit 117 (Step S605). The processes mentioned in Steps S604 and S605 are the processes mentioned in Steps S417 to S420 of the backup unit 110 shown in FIG. 4B.

If the sequence-number holding unit 118 is non-volatile, it is not necessary to perform processes from Step S606 onwards that are explained below. This is because if the sequence-number holding unit 118 is non-volatile, the sequence number maintained by the sequence-number holding unit 118 is not lost even if sudden power outage occurs. However, the processes from Step S606 onwards are necessary when the sequence-number holding unit 118 is volatile. The processes are performed to ensure that the backup data of the same sequence number remains in the non-volatile backup memory 130 at the time of performing the commit process regardless of the sequence number maintained by the sequence-number holding unit 118 is lost due to sudden power outage.

The write-pointer accessing unit 142 reads the write pointer from the write-pointer holding unit 117 of the backup unit 110 (Step S606). The commit-data writing unit 143 retrieves from the commit-data write-address holding unit 144, the address of the non-volatile main memory unit 120 in which the commit data is written (Step S607). The commit-data writing unit 143 requests for writing the value of the write pointer to the storage area of the non-volatile main memory unit 120 indicated by the retrieved address (Step S608). In response to the request, the backup process indicated in FIGS. 4A and 4B is performed. Thus, because the backup data including the new sequence number is written at the position of the write pointer that is reset by the backup unit 110, the latest sequence that is stored in the non-volatile backup memory 130 is invalidated and the newly stored backup data becomes the latest sequence.

Figure 7A:
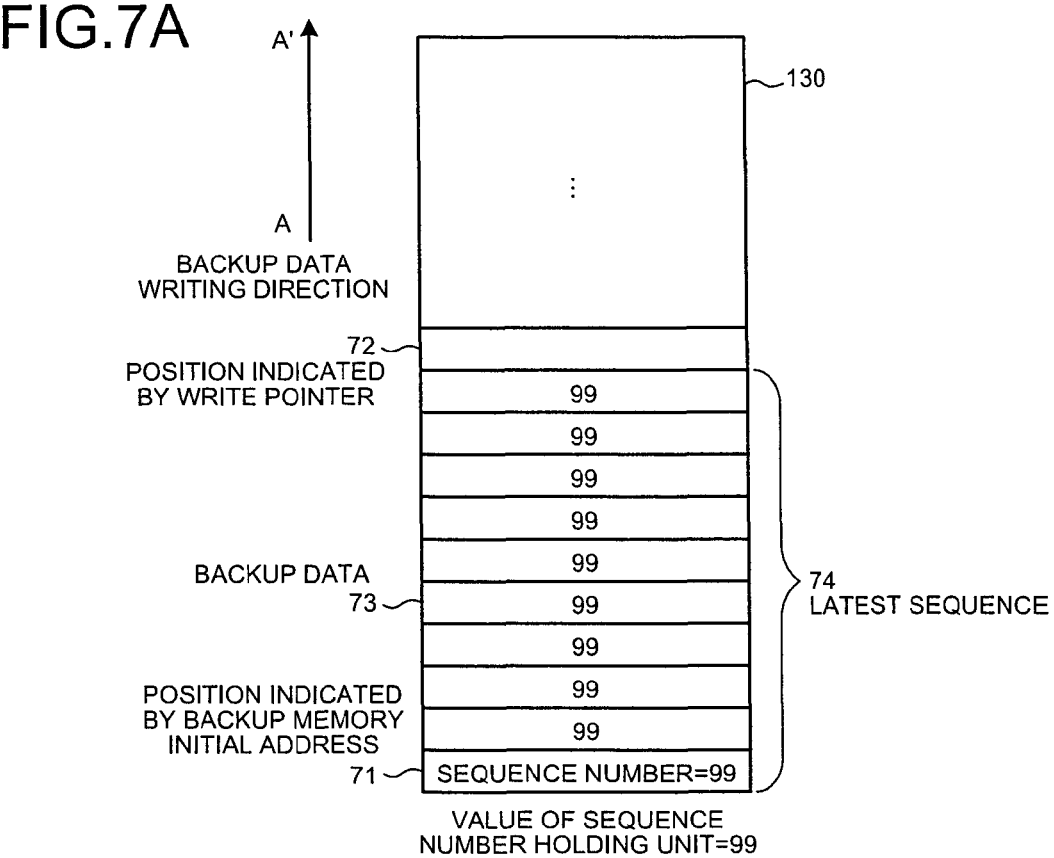
FIG. 7A is a drawing of an example for explaining a status of a non-volatile backup memory (stack) before starting the commit process.
Figure 7B:
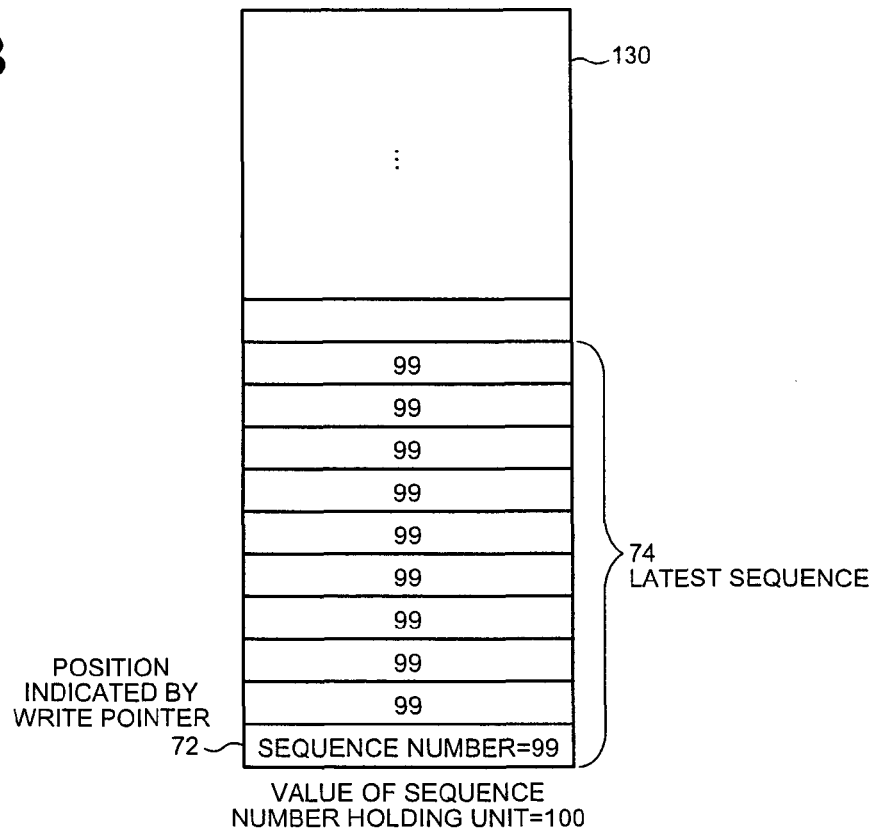
FIG. 7B is a drawing of an example for explaining a status of the non-volatile backup memory (stack) after a sequence number and a write pointer are updated.

Transition of the data stored in the non-volatile backup memory 130 at the time of the commit process is explained below. FIGS. 7A to 7C are drawings of examples for explaining the status of the non-volatile backup memory 130 (stack) at the time of the commit process. In FIG. 7A, the status of the non-volatile backup memory 130 before the commit unit 140 starts the commit process is indicated. A backup data 73 indicates a single backup data and a plurality of backup data is stored in the non-volatile backup memory 130 shown in FIG. 7A. Thus, because the sequence number maintained by the sequence-number holding unit 118 is "99", the entire backup data of the sequence number "99" that is stored in the non-volatile backup memory 130 is indicated as a latest sequence 74. A position 71 indicated by the backup-memory initial-address is the initial address of the non-volatile backup memory 130. A position 72 indicated by the write pointer indicates a position in which the next backup data is written in the latest sequence 74. The data is written in a direction of A→A'.

FIG. 7B is the example for explaining the status indicating that the sequence number and the write pointer are updated. In response to a commit request from the control software 170, first, the commit unit 140 updates the sequence number. As shown in FIG. 7A, because the sequence number maintained by the sequence-number holding unit 118 of the backup unit 110 is "99", the commit unit 140 sets a value obtained after adding one to 99, in other words, "100" as a new sequence number. The backup unit 110 resets the write pointer. In other words, the backup unit 110 sets the value maintained by the backup-memory initial-address holding unit 116 in the write-pointer holding unit 117. By performing two processes mentioned earlier, the position 72 indicated by the write pointer becomes the initial address of the non-volatile backup memory 130. If the sequence-number holding unit 118 is non-volatile, the commit process can be ended.

FIG. 7C is the example for explaining the status indicating that the backup data that uses the new sequence number is written. The commit unit 140 reads the address that is in the non-volatile main memory unit 120 and that is stored in the commit-data write-address holding unit 144, and writes the value of the write pointer to an area of the read address. The backup process is performed with respect to the writing process. The new sequence number, in other words, the backup data of the sequence number "100" is stored in the non-volatile backup memory 130. By performing the processes mentioned earlier, as shown in FIG. 7C, the backup data of the sequence number "99" is overwritten with the backup data of the sequence number "100". The backup data of the sequence number "99" at the position 72 indicated by the write pointer becomes an old sequence and the backup data of the sequence number "100" becomes the latest sequence 74. In other words, the commit unit 140 invalidates the previous sequence.

Figure 8A:
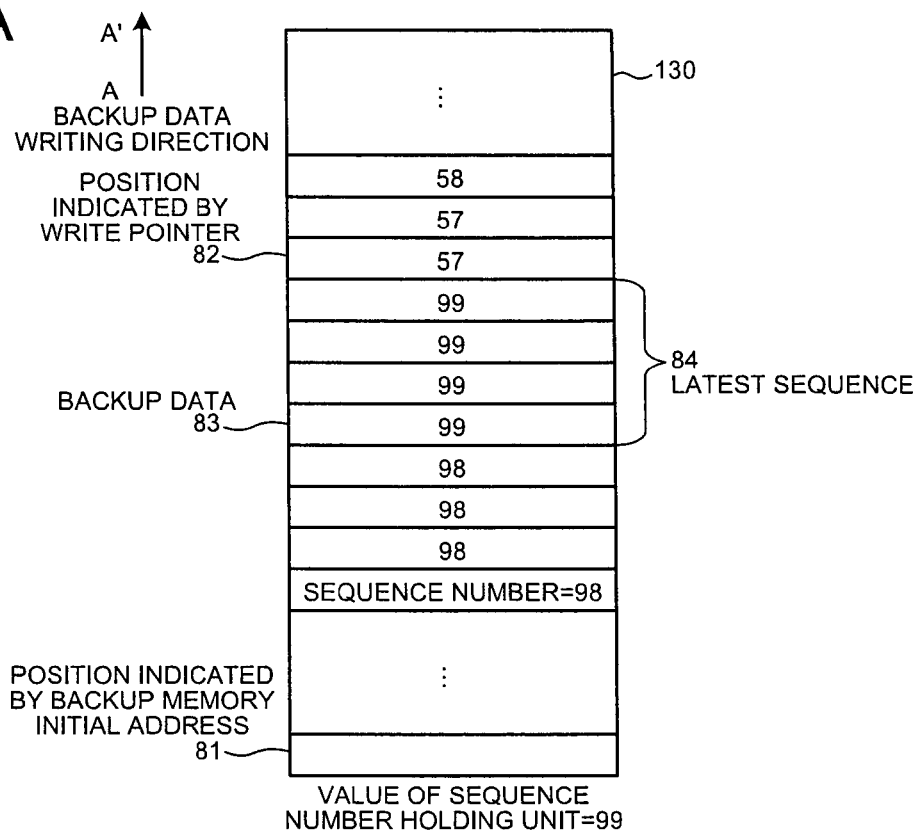
FIG. 8A is a drawing of an example for explaining a status of a non-volatile backup memory (ring buffer) before starting the commit process.
Figure 8B:
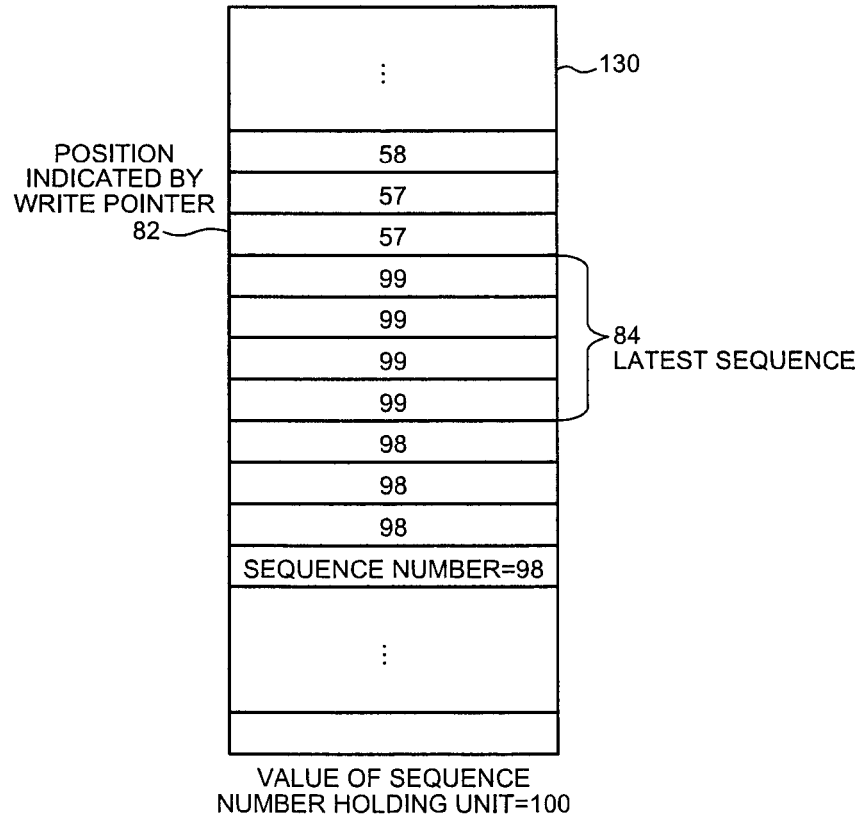
FIG. 8B is a drawing of another example for explaining a status of the non-volatile backup memory (ring buffer) after the sequence number and the write pointer are updated.

A memory status of the commit process when the non-volatile backup memory 130 is used as the ring buffer is explained below. FIGS. 8A to 8C are drawings of examples for explaining the status of the non-volatile backup memory (ring buffer) at the time of the commit process. FIG. 8A is the drawing of the example for explaining the status of the non-volatile backup memory 130 before the commit process is started by the commit unit 140. A backup data 83 is a single backup data and a plurality of backup data is stored in the non-volatile backup memory 130. In FIG. 8A, the sequence number maintained by the sequence-number holding unit 118 is "99" and the backup data of the sequence number "99"

stored in the non-volatile backup memory 130 is a latest sequence 84. A position 81 indicating the backup-memory initial-address is the initial address of the non-volatile backup memory 130. A position 82 indicated by the write pointer indicates a position at which the subsequent backup data 83 in the latest sequence 84 is written. The data is written in the direction of A→A'.

FIG. 8B is the drawing of the example for explaining the status indicating that the sequence number and the write pointer (the position 82 indicated by the write pointer) are updated. In response to the commit request from the control software 170, the commit unit 140 updates the sequence number. In FIG. 8A, the sequence number maintained by the sequence-number holding unit 118 of the backup unit 110 is "99". Thus, the commit unit 140 sets the value obtained after adding one to 99, in other words, "100" as the new sequence number. The backup unit 110 resets the write pointer. However, in the example, the non-volatile backup memory 130 is used as the ring buffer. Thus, operations of the non-volatile backup memory 130 differ from the operations when the non-volatile backup memory 130 is the stack. Even if the initial address of the non-volatile backup memory 130 maintained by the backup-memory initial-address holding unit 116 is not set, the old sequence is overwritten with the new sequence. Thus, no actual operation is carried out. If the sequence-number holding unit 118 is non-volatile, the commit process can be ended. The latest sequence becomes the reference numeral 84.

FIG. 8C is the drawing of the example for explaining the status indicating that the backup data using the new sequence number is written. The commit unit 140 reads the address that is in the non-volatile main memory unit 120 and that is stored in the commit-data write-address holding unit 144 and writes the value of the write pointer to the area of the read address. The backup process is performed with respect to the writing process and the backup data of the new sequence number, in other words, "100" is stored in the non-volatile backup memory 130. By performing the processes mentioned earlier, as shown in FIG. 8C, the backup data of the sequence number "100" is written subsequent to the backup data of the sequence number "99" in the non-volatile backup memory 130. Due to this, the backup data of the sequence number "99" becomes the old sequence and the backup data of the sequence number "100" becomes the latest sequence 84. In other words, the commit unit 140 invalidates the previous sequence. In FIG. 8C, the reference numeral 82 is the position indicated by the write pointer.

Thus, the commit unit 140 according to the present embodiment creates the single backup data of the new sequence number, thereby enabling to invalidate the latest sequence in the commit process at the time of creating the checkpoint.

Figure 9:
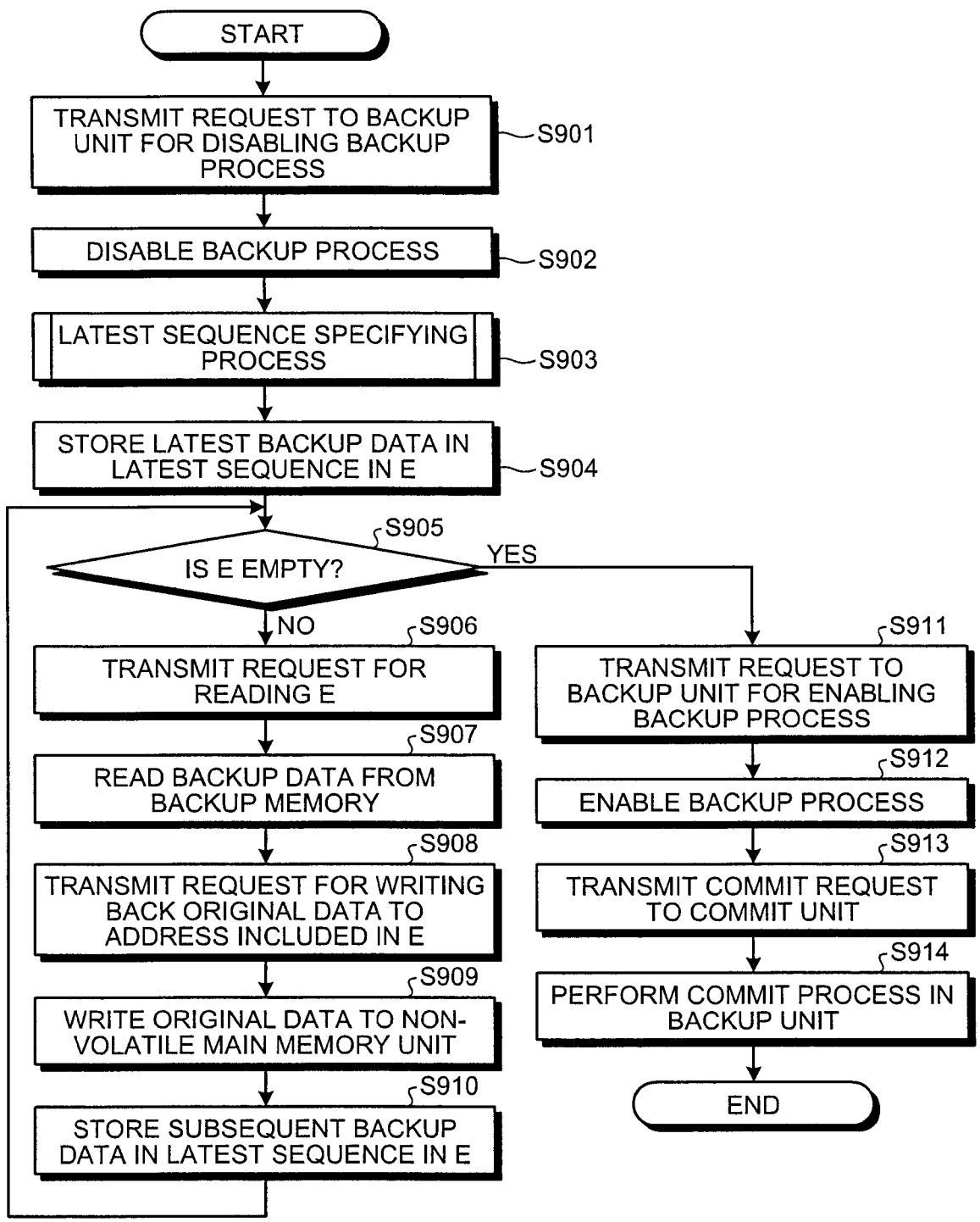
FIG. 9 is a flowchart for explaining a rollback process.

The rollback process performed by the rollback unit 150 is explained below with reference to FIG. 9. The rollback unit 150 starts by the instructions from the control software 170 that is operated in the processor unit 160.

The rollback controller 151 transmits a request to the backup unit 110 for disabling the backup process (Step S901). The backup unit 110 disables the backup process (Step S902). Due to this, while writing back the backup data to the non-volatile main memory unit 120, the data of the non-volatile main memory unit 120, which is not specified due to sudden power outage, is not stored as the backup data in the non-volatile backup memory 130.

The rollback-data specifying unit 152 then performs a latest sequence specifying process (Step S903) that is described in detail later. The rollback-data reading unit 153 stores a latest read backup data in the latest sequence in E (Step S904). The rollback-data reading unit 153 determines whether E is empty (Step S905).

Upon determining that E is not empty (No at Step S905), the rollback-data reading unit 153 transmits the read request to the backup unit 110 (Step S906). The backup unit 110 reads the backup data from the non-volatile backup memory 130 (Step S907) and stores the read backup data in E. The rollback-data write-back unit 154 transmits to the backup unit 110, a request for writing back the original data to the write destination address included in E (Step S908). The backup unit 110 writes the original data to the indicated address of the non-volatile main memory unit 120 (Step S909). The rollback-data reading unit 153 stores in E, the subsequent backup data in the latest sequence (Step S910). Due to this, backup data can be read in a reverse sequence of the recorded time in the latest sequence, in other words, in a newly stored sequence. Returning to Step S905, the processes from Steps S905 to S910 are repeated for the entire backup data in the latest sequence.

At Step 905, upon determining that E is empty (Yes at Step S905), the rollback controller 151 transmits to the backup unit 110, a request for enabling the backup process (Step S911). The backup unit 110 enables the backup process (Step S912). The rollback controller 151 transmits the commit request to the commit unit 140 (Step S913). The commit unit 140 performs the commit process (Step S914). Due to this, the checkpoint at the time of completion of the rollback process is generated.

The latest sequence specifying process performed by the rollback-data specifying unit 152 is explained below with reference to FIG. 10.

First, the rollback-data specifying unit 152 selects the single backup data from the non-volatile backup memory 130 and stores the selected backup data in data A (Step S1001). The backup data can be arbitrarily selected. The rollback-data specifying unit 152 verifies by using the integrity verification data, whether the data A is a complete data (Step S1002). An integrity verification method depends on the data that is used as the integrity verification data. For example, if the backup data is structured as shown in FIG. 2 and a copy of the sequence number is used as the integrity verification data, the integrity verification data is compared with the sequence number. If the integrity verification data matches with the sequence number, an integrity verification result is determined as satisfactory and if the integrity verification data does not match with the sequence number, the integrity verification result is determined as not satisfactory.

The rollback-data specifying unit 152 determines whether the integrity verification result of the data A is satisfactory (Step S1003). Upon determining that the integrity verification result of the data A is not satisfactory (No at Step S1003), the backup data immediately preceding the current data A is stored in the data A (Step S1004) and the process returns to Step S1002.

Upon determining that the integrity verification result of the data A is satisfactory (Yes at Step S1003), the backup data immediately preceding the data A is stored in data B (Step S1005). The rollback-data specifying unit 152 verifies by using the integrity verification data whether the data B is a complete data (Step S1006). The rollback-data specifying unit 152 determines whether the integrity verification result of the data B is satisfactory (Step S1007). Upon determining that the integrity verification result of the data B is not satisfactory (No at Step S1007), the process proceeds to Step S1010.

Upon determining that the integrity verification result of the data B is satisfactory (Yes at Step S1007), the rollback-data specifying unit 152 determines whether the sequence number of the data B is smaller than the sequence number of the data A (Step S1008). Upon determining that the sequence number of the data B is not smaller than the sequence number of the data A, in other words, the sequence number of the data A is greater than or equal to the sequence number of the data B (No at Step S1008), the rollback-data specifying unit 152 stores contents of the data B in the data A (Step S1009) and returns to Step S1002.

Upon determining that the sequence number of the data B is smaller than the sequence number of the data A (Yes at Step S1008), the rollback-data specifying unit 152 stores in the data C, the backup data that is stored at the back of the data A and that includes the sequence number different from the data A or the initial backup data that is stored at the back of the data A and that is determined as not satisfactory in the integrity verification result (Step S1010). The rollback-data specifying unit 152 determines whether the integrity verification result of the data C is satisfactory (Step S1011). Upon determining that the integrity verification result of the data C is satisfactory (Yes at Step S1011), the rollback-data specifying unit 152 determines whether the sequence number of the data A is smaller that the sequence number of the data C (Step S1012). Upon determining that the sequence number of the data A is smaller than the sequence number of the data C (Yes at Step S1012), the rollback-data specifying unit 152 stores contents of the data C in the data A (Step S1013) and returns to Step S1002.

Upon determining at Step S1011 that the integrity verification result of the data C is not satisfactory (No at Step S1011), or upon determining at Step S1012 that the sequence number of the data A is not smaller than the sequence number of the data C (No at Step S1012), the rollback-data specifying unit 152 treats an initial data as the data A and the rearmost rollback data as the data immediately preceding the data C (Step S1014). It is determined that the sequence number of the data A is not smaller than the sequence number of the data C. However, based on determination at Steps S1010 and S1011, the sequence number of the data A is not likely to become equal to the sequence number of the data C. Thus, it is determined that the sequence number of the data A is greater than the sequence number of the data C.

Thus, even if the power outage occurs while writing the backup data to the non-volatile backup memory 130, the backup data, which is verified based on the integrity verification data and is written completely, and which is necessary for restoring the status, of the non-volatile main memory unit 120, at the time of the latest checkpoint, can be properly detected. Furthermore, writing back is carried out to the original data only by using the properly detected backup data. Thus, the data of the non-volatile main memory unit 120 at the time of the checkpoint can be accurately recreated.

Upon detecting the write access to the non-volatile main memory unit 120, instead of immediately writing the data to the non-volatile main memory unit 120, the data is written to the non-volatile main memory unit 120 after the backup data is stored in the non-volatile backup memory 130. Thus, if the power outage occurs while writing the backup data, the backup data, which is not complete, is written to the non-volatile backup memory 130 and because the data is not yet written to the non-volatile main memory unit 120, the backup data, which is not complete, is not used at the time of rollback and the status of the consistent non-volatile main memory unit 120 can be recreated.

Figure 10:
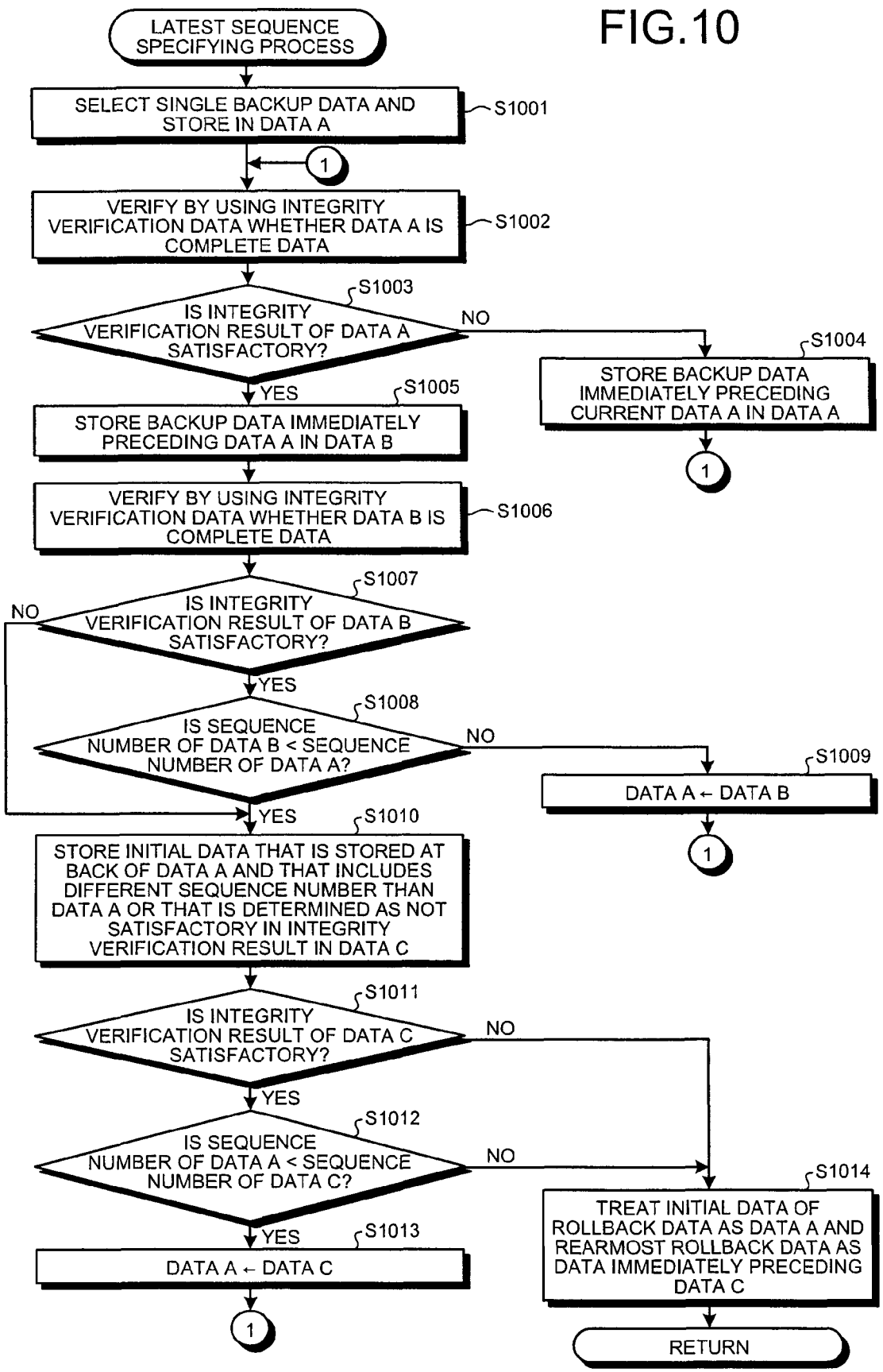
FIG. 10 is a flowchart for explaining a latest sequence specifying process.

If the sequence-number holding unit 118 is non-volatile, instead of the process mentioned in FIG. 10, the rollback-data specifying unit 152 searches from the backup data stored in the non-volatile backup memory 130, the backup data that is determined as satisfactory in the integrity verification result based on the integrity verification data and that includes the sequence number similar to the sequence number maintained by the sequence-number holding unit 118, thereby enabling to detect the data for using in rollback. However, the process mentioned in FIG. 9 remains the same even if the sequence-number holding unit 118 is volatile or non-volatile.

Figure 11:
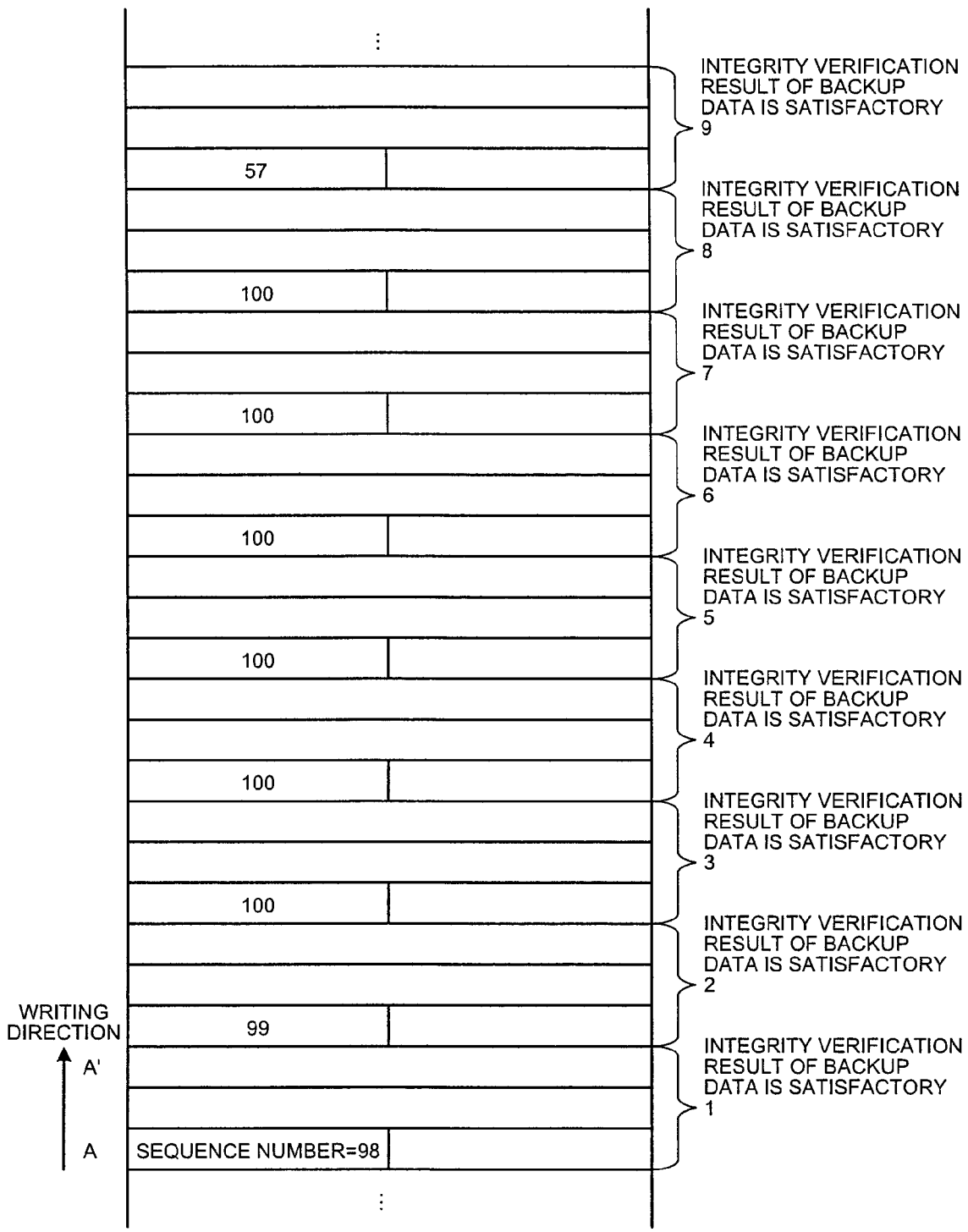
FIG. 11 is a drawing of an example for explaining a status of the non-volatile backup memory.
Figure 12:
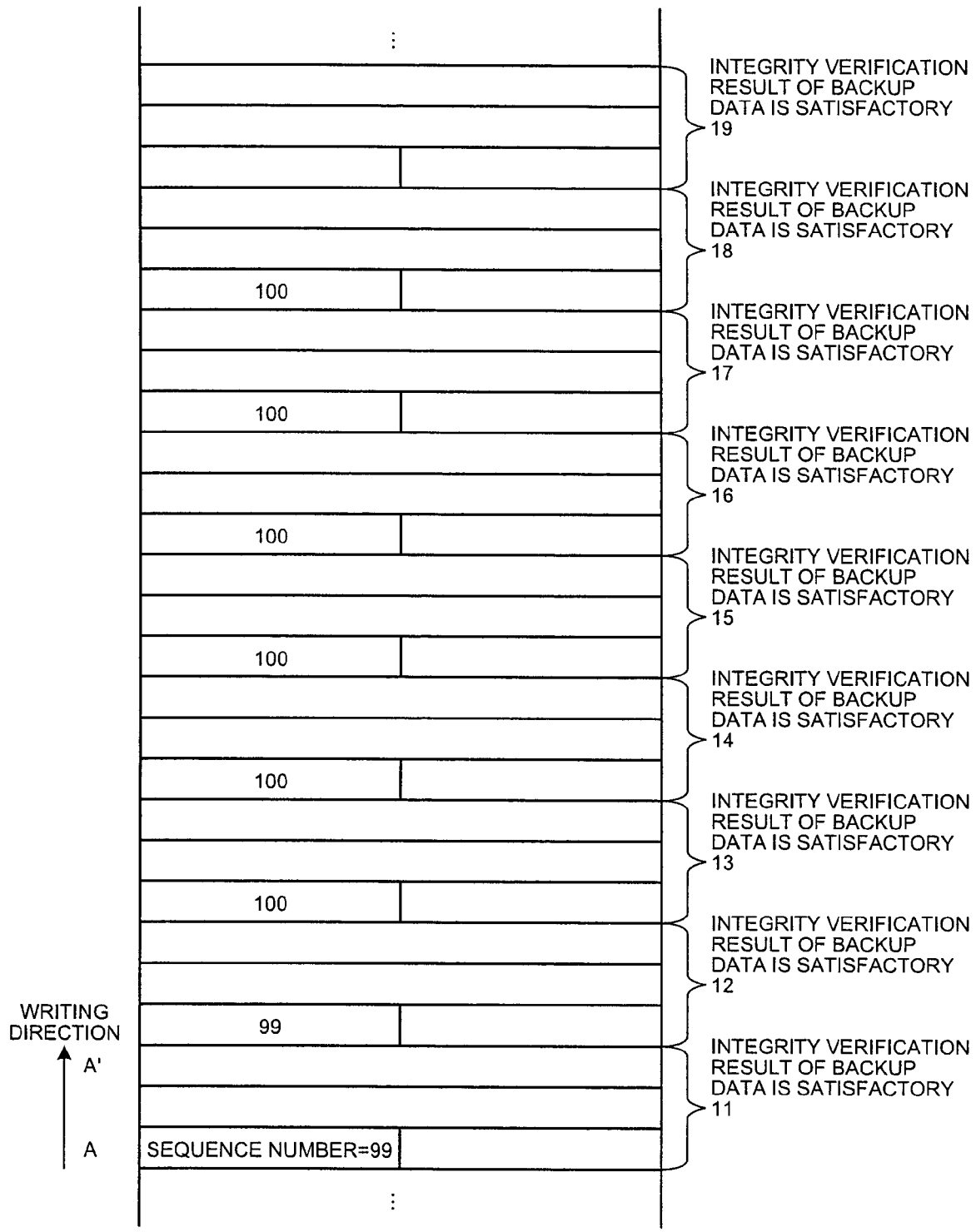
FIG. 12 is a drawing of another example for explaining a status of the non-volatile backup memory.

Specifically by referring to the status of the non-volatile backup memory 130, the latest sequence specifying process is explained with reference to the flowchart mentioned in FIG. 10. The process becomes further complex in FIGS. 11 and 12. FIGS. 11 and 12 are drawings of examples for explaining the sequence-number holding unit 118 that is volatile. However, the process explained in FIGS. 11 and 12 is applicable when the sequence-number holding unit 118 is non-volatile.

FIG. 11 is the drawing of the example for explaining the status of the non-volatile backup memory 130. A portion of the non-volatile backup memory 130 is indicated in FIG. 11. The non-volatile backup memory 130 stores backup data 1 to 9 that is determined as satisfactory in the integrity verification result.

First, the rollback-data specifying unit 152 selects, for example, the backup data 4 from the non-volatile backup memory 130 and stores the selected backup data 4 in the data A (Step S1001). The rollback-data specifying unit 152 verifies by using the integrity verification data, whether the data A is the complete data (Step S1002).

Upon determining that the integrity verification result of the data A is satisfactory (Yes at Step S1003), the rollback-data specifying unit 152 stores the backup data 3 immediately preceding the data A in the data B (Step S1005). The rollback-data specifying unit 152 verifies using the integrity verification data, whether the data B is the complete data (Step S1006).

Upon determining that the integrity verification result of the data B is satisfactory (Yes at Step S1007), the rollback-data specifying unit 152 determines whether the sequence number "100" of the data B is smaller than the sequence number "100" of the data A (Step S1008). Upon determining that the sequence number of the data B is not smaller than the sequence number of the data A, in other words, the sequence number of the data B is greater than or equal to the sequence number of the data A (No at Step S1008), the rollback-data specifying unit 152 stores the contents of the data B in the data A (Step S1009) and returns to Step S1002. In other words, the backup data 3 is stored in the data A.

The rollback-data specifying unit 152 then verifies by using the integrity verification data, whether the data A is the complete data (Step S1002). Upon determining that the integrity verification result of the data A is satisfactory (Yes at Step S1003), the rollback-data specifying unit 152 stores the backup data 2 immediately preceding the data A in the data B (Step S1005). The rollback-data specifying unit 152 verifies by using the integrity verification data, whether the data B is the complete data (Step S1006). Upon determining that the integrity verification result of the data B is satisfactory (Yes at Step S1007), the rollback-data specifying unit 152 determines whether the sequence number of the data B is smaller than the sequence number of the data A (Step S1008).

Upon determining that the sequence number "99" of the data B is smaller than the sequence number "100" of the data A (Yes at Step S1008), the rollback-data specifying unit 152 stores in the data C, the backup data 9 that is stored at the back of the data A and that includes the sequence number different from the data A (Step S1010). Upon determining that the integrity verification result of the data C is satisfactory (Yes at Step S1011), the rollback-data specifying unit 152 determines whether the sequence number "100" of the data A is smaller than the sequence number "57" of the data C (Step S1012). Upon determining that the sequence number of the data A is not smaller than the sequence number of the data C (No at Step S1012), the rollback-data specifying unit 152 treats the initial backup data as the data A, in other words, the backup data 3, and the rearmost backup data as the data immediately preceding the data C, in other words, the backup data 8 (Step S1014).

Thus, in the latest sequence, the backup data 3 can be specified as the initial backup data and the backup data 8 can be specified as the rearmost backup data. By returning to Step S904 mentioned in FIG. 9, rollback is carried out by using the backup data of the specified latest sequence.

The latest sequence specifying process when the backup data includes the data, which is not complete, is explained below. FIG. 12 is the example for explaining the status of the non-volatile backup memory 130. The portion of the non-volatile backup memory 130 is indicated in FIG. 12. The non-volatile backup memory 130 stores backup data 11 to 18 that is determined as satisfactory in the integrity verification result and a backup data 19 that is determined as not satisfactory in the integrity verification result. The backup data 19 is not completely written to the non-volatile backup memory 130 due to the power outage while writing the backup data.

First, the rollback-data specifying unit 152 selects, for example, the backup data 13 from the non-volatile backup memory 130 and stores the selected backup data 13 in the data A (Step S1001). The rollback-data specifying unit 152 verifies by using the integrity verification data, whether the data A is the complete data (Step S1002). Upon determining that the integrity verification result of the data A is satisfactory (Yes at Step S1003), the rollback-data specifying unit 152 stores the backup data immediately preceding the data A in the data B (Step S1005). The rollback-data specifying unit 152 verifies by using the integrity verification data, whether the data B is the complete data (Step S1006).

Upon determining that the integrity verification result of the data B is satisfactory (Yes at Step S1007), the rollback-data specifying unit 152 determines whether the sequence number "99" of the data B is smaller than the sequence number "100" of the data A (Step S1008). Upon determining that the sequence number of the data B is smaller than the sequence number of the data A (Yes at Step S1008), the rollback-data specifying unit 152 stores in the data C, the initial backup data 19 that is stored at the back of the data A and that is determined as not satisfactory in the integrity verification result (Step S1010).

Upon determining that the integrity verification result of the data C is not satisfactory (No at Step S1011), the rollback-data specifying unit 152 treats the initial rollback data as the data A, in other words, the backup data 13 and treats the rearmost rollback data as the data immediately preceding the data C, in other words, the backup data 18 (Step S1014).

Thus, in the latest sequence, the backup data 13 can be specified as the initial backup data and the backup data 18 can be specified as the rearmost backup data. The rollback is carried out by using the latest sequence.

Thus, even if sudden power outage occurs during writing of the backup data by the backup unit 110 to the non-volatile backup memory 130 and the backup data is written to the non-volatile backup memory 130 in the incomplete manner, the data necessary for rollback can be properly specified by the process of the sequence number, the integrity verification data, and the rollback-data specifying unit 152.

The backup process, the commit process, and the rollback process performed by the PC 100 are explained below with reference to FIG. 13. The process of each unit is indicated in a vertical direction. An arrow connecting each unit indicates a control via a signal line connecting each unit and transactions of data signals. The time advances from A to A' direction.

First, the backup unit 110 detects the write access, which is via the bus 180, to the non-volatile main memory unit 120 (Step S1301). Upon detecting the write access to the non-volatile main memory unit 120, the backup unit 110 retrieves the write destination address of the non-volatile main memory unit 120 (Step S1302). The backup unit 110 checks whether the backup process is enabled (Step S1303). If the backup process is enabled, the backup unit 110 reads from the non-volatile main memory unit 120, the original data stored in the write destination address that is included in the write access (Steps S1304 and S1305). The backup unit 110 generates the backup data from the original data and the write destination address, the sequence number, and the integrity verification data of the non-volatile main memory unit 120 (Step S1306). A data length of the backup data that is generated is arranged in integral multiplication of a data width of the non-volatile backup memory 130. Due to this, the backup data can be smoothly written to the non-volatile backup memory 130.

The backup unit 110 writes the generated backup data to the non-volatile backup memory 130 (Step S1307). The backup data is written to the storage area, of the non-volatile backup memory 130, indicated by the write pointer maintained in the write-pointer holding unit 117. The backup unit 110 writes the data that is included in the write access to the write destination address, of the non-volatile main memory unit 120, that is included in the write access (Step S1308). The backup unit 110 updates the write pointer of the non-volatile backup memory 130 (Step S1309).

The commit process is explained below with reference to FIG. 14.

First, the control software 170 instructs the commit unit 140 for commit process (Step S1401). The commit unit 140 reads the sequence number (Steps S1402 and S1403) and calculates the new sequence number (Step S1404). Specifically, the value obtained after adding one to the sequence number read from the sequence-number holding unit 118 is the new sequence number. The commit unit 140 transmits the new sequence number to the backup unit 110 (Step S1405). The backup unit 110 sets the new sequence number in the sequence-number holding unit 118 (Step S1406). The backup unit 110 resets the write pointer maintained in the write-pointer holding unit 117 (Step S1407). The write pointer is reset when the non-volatile backup memory 130 is used as the stack. The write pointer is not reset when the non-volatile backup memory 130 is used as the ring buffer. The commit process can be ended at Step S1407 if the sequence-number holding unit 118 is non-volatile.

The commit unit 140 reads the write pointer from the write-pointer holding unit 117 of the backup unit 110 (Steps S1408 and S1409). The commit unit 140 transmits to the backup unit 110, the write access, to the non-volatile main memory unit 120, of the write pointer (Step S1410). The write access is writing the value of the write pointer to the address maintained in the commit-data write-address holding unit 144 of the non-volatile main memory unit 120. Upon detecting the write access, the backup unit 110 performs the backup process (Steps S1411 to S1418). The backup process is similar to the processes mentioned in Steps S1302 to S1309 of the backup process explained in FIG. 13. Thus, the explanation is omitted. In the backup process, the single backup data of the new sequence number that is set by the commit unit 140 is created and the latest sequence in the non-volatile backup memory 130, which was latest until creation of new backup data of the new sequence, is invalidated.

The rollback process is explained below with reference to FIG. 15.

First, the control software 170 requests the rollback unit 150, for rollback (Step S1501). The rollback unit 150 disables the backup process of the backup unit 110 (Step S1502). The rollback unit 150 specifies the backup data of the latest sequence from the non-volatile backup memory 130 (Step S1503). The rollback unit 150 reads the backup data of the latest sequence from the non-volatile backup memory 130 (Steps S1504 and S1505). The rollback unit 150 writes back the original data to the non-volatile main memory unit 120 by using the backup data of the latest sequence (Step S1506).

The rollback unit 150 sets the sequence number of the sequence used for the rollback in the sequence-number holding unit 118 of the backup unit 110 (Step S1507). For example, "99" is set as the sequence number when the rollback is carried out by using the backup data of the sequence number "99". From the backup data used for the rollback, the rollback unit 150 sets in the write-pointer holding unit 117 of the backup unit 110, the address subsequent to the rearmost backup data, in other words, the data that is backed up at the end (the backup data indicating the original data that is initially written back to the non-volatile main memory unit 120) (Step S1508). For example, if the address of the backup data used for the rollback is "12", "13" is set as the write pointer.

The rollback unit 150 enables the backup process of the backup unit 110 (Step S1509). The rollback unit 150 requests the commit unit 140 for commit process (Step S1510).

The subsequent processes are similar to the processes mentioned in Steps S1402 to S1418 of the commit process explained in FIG. 14. Thus, the explanation is omitted. In the commit process, the new sequence number is set as the sequence number. For example, if the sequence number of the sequence used for the rollback is "99", "100" is set as the new sequence number. If the non-volatile backup memory 130 is used as the stack, the initial address of the non-volatile backup memory 130 is set as the write pointer and if the non-volatile backup memory 130 is used as the ring buffer, the address, which is already set and is subsequent to the backup data that is used in the rollback, is set as the write pointer.

Thus, in the backup process, the commit process, and the rollback process, the backup unit 110, the commit unit 140, and the rollback unit 150 operate in cooperation with each other. In the present embodiment, by using the sequence number and the integrity verification data, the rollback unit 150 can specify the data necessary for the rollback, thereby enabling to accurately restore the status of the non-volatile main memory unit 120 at the time of the checkpoint. If the backup data is formed in various structures or if various methods are used to store data in the non-volatile backup memory 130 or to retrieve from the non-volatile backup memory 130, the contents of the non-volatile main memory unit 120 can be rolled back. Consequently, at the time of restoring power after sudden power outage, computer operations can be guaranteed.

The present invention in its broader aspects is not limited to the specific details and representative embodiments shown and described herein. Accordingly, various modifications in the constituent elements may be made without departing from the spirit or scope of the general inventive concept as defined by the appended claims and their equivalents. Various embodiments can be formed by combining a plurality of constituent elements disclosed in the embodiment according to the present invention. For example, some constituent elements can be deleted from the constituent elements indicated in the present embodiment. Furthermore, the constituent elements in different embodiments can be arbitrarily combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:
   a main memory unit that is non-volatile and has a plurality of first storage areas;
   a backup memory unit that is non-volatile;
   a sequence number storage unit that stores a sequence number used at the time of identifying whether data stored in the backup memory unit needs to be written back to the main memory unit;
   a first reading unit that reads original data stored in the first storage area specified by a write destination address when a write access is detected, the write access being transmitted from a processor unit, the write access including first data and a write destination address, the first data being data to be written to the main memory unit, the write destination address specifying a write destination of the first data;
   a second reading unit that reads the sequence number stored in the sequence number storage unit;
   a first writing unit that writes backup data to the backup memory unit, the backup data including the original data, the write destination address included in the write access, the sequence number, and integrity verification data that indicates whether the original data, the write destination address, and the sequence number are completely written to the backup memory unit;
   a second writing unit that writes the first data to the first storage area of the main memory unit specified by the write destination address, after the backup data is written to the backup memory unit;
   an updating unit that updates a value of the sequence number stored in the sequence number storage unit;
   a selecting unit that selects first backup data from the backup data stored in the backup memory unit when an instruction for writing back the original data to the main memory unit is received, the first backup data including the sequence number stored in the sequence number storage unit and including the integrity verification data indicating that the data is completely written;
   an extracting unit that extracts the original data and the write destination address included in the first backup data; and
   a third writing unit that writes, for each of the original data and the write address extracted from the first backup data, the original data to the first storage area in the main memory unit indicated by the write destination address;
   wherein a value of the integrity verification data is equal to one of the original data, the write destination address, and the sequence number; and
   wherein writing backup data to the backup memory unit by the first writing unit further comprises:

writing the integrity verification data to a second storage area, then writing backup data that does not have a value equal to the integrity verification data to a third storage area, and then writing backup data that has a value equal to the integrity verification data to a fourth storage area.

2. The apparatus according to claim 1, wherein the sequence number storage unit is volatile, the updating unit includes a write address storage unit that stores an address indicating the first storage area in the main memory unit, and the second writing unit writes the first data to the first storage area in the main memory unit indicated by the address stored in the write address storage unit, after modifying the sequence number stored in the sequence number storage unit.

3. The apparatus according to claim 1, further comprising:

a write address storage unit that stores a write address of the backup data in the backup memory unit; and a write address setting unit that sets, after modifying the sequence number stored in the sequence number storage unit, a first memory address of the backup memory unit to the write address stored in the write address storage unit.

4. A data recovering method executed in an information processing apparatus that includes a main memory unit that is non-volatile and has a plurality of first storage areas, a backup memory unit that is non-volatile, and a sequence number storage unit that stores a sequence number used at the time of identifying whether data stored in the backup memory unit needs to be written back to the main memory unit, the method comprising:

reading original data stored in the first storage area specified by a write destination address when a write access is detected, the write access being transmitted from a processor unit, the write address including first data and a write destination address, the first data being data to be written to the main memory unit, the write destination address specifying a write destination of the first data;

reading the sequence number stored in the sequence number storage unit;

writing backup data to the backup memory unit, the backup data including the original data, the write destination address included in the write access, the sequence number, and integrity verification data that indicates whether the original data, the write destination address, and the sequence number are completely written to the backup memory unit;

writing the first data to the first storage area of the main memory unit specified by the write destination address, after the backup data is written to the backup memory unit;

updating a value of the sequence number stored in the sequence number storage unit;

selecting first backup data from the backup data stored in the backup memory unit when an instruction for writing back the original data to the main memory unit is received, the first backup data including the sequence number stored in the sequence number storage unit and including the integrity verification data indicating that the data is completely written;

extracting the original data and the write destination address included in the first backup data; and writing, for each of the original data and the write address extracted from the first backup data, the original data to the first storage area in the main memory unit indicated by the write destination address;

wherein a value of the integrity verification data is equal to one of the original data, the write destination address, and the sequence number; and wherein the writing the backup data further comprises:

writing the integrity verification data to a second storage area, then writing backup data that does not have a value equal to the integrity verification data to a third storage area, and then writing backup data that has a value equal to the integrity verification data to a fourth storage area.

* * * * *